United States Patent
Binnard et al.

(10) Patent No.: US 12,151,378 B2
(45) Date of Patent: Nov. 26, 2024

(54) VIBRATION REDUCTION SYSTEM FOR PRECISION ROBOTICS APPLICATIONS

(71) Applicant: Nikon Corporation, Tokyo (JP)

(72) Inventors: Michael Birk Binnard, Belmont, CA (US); Yoon Jung Jeong, San Mateo, CA (US); Alton Hugh Phillips, Oro Valley, AZ (US)

(73) Assignee: NIKON CORPORATION, Tokyo (JP)

( * ) Notice: Subject to any disclaimer, the term of this patent is extended or adjusted under 35 U.S.C. 154(b) by 35 days.

(21) Appl. No.: 17/496,711

(22) Filed: Oct. 7, 2021

(65) Prior Publication Data

US 2022/0111521 A1 Apr. 14, 2022

Related U.S. Application Data

(60) Provisional application No. 63/090,008, filed on Oct. 9, 2020.

(51) Int. Cl.
*B25J 9/16* (2006.01)
*B25J 9/00* (2006.01)
*B25J 9/12* (2006.01)
*B25J 9/14* (2006.01)
*B25J 13/08* (2006.01)

(52) U.S. Cl.
CPC ........... *B25J 9/1664* (2013.01); *B25J 9/0009* (2013.01); *B25J 9/003* (2013.01); *B25J 9/123* (2013.01); *B25J 9/144* (2013.01); *B25J 9/1623* (2013.01); *B25J 13/088* (2013.01); *G05B 2219/50162* (2013.01)

(58) Field of Classification Search
CPC . B25J 9/0009; B25J 9/003; B25J 9/123; B25J 9/144; B25J 9/1623; B25J 9/1664; B25J 13/088; G05B 2219/50162
See application file for complete search history.

(56) References Cited

U.S. PATENT DOCUMENTS

| | | | |
|---|---|---|---|
| 5,291,975 A | 3/1994 | Johnson et al. |
| 5,816,122 A | 10/1998 | Benning et al. |
| 6,523,695 B1 | 2/2003 | Ueta et al. |
| 6,590,639 B1 | 7/2003 | Yuan et al. |
| 6,758,313 B2 | 7/2004 | Binnard |

(Continued)

FOREIGN PATENT DOCUMENTS

| | | | | |
|---|---|---|---|---|
| CN | 103438142 B | * | 1/2016 | .......... F16F 15/0232 |
| WO | 2007054860 A2 | | 5/2007 | |

OTHER PUBLICATIONS

Gong, "Design Analysis of a Stewart Platform for Vehicle Emulator Systems," Thesis, Massachusetts Institute of Technology, Jan. 1992.

(Continued)

*Primary Examiner* — Dale Moyer
(74) *Attorney, Agent, or Firm* — Klarquist Sparkman, LLP

(57) ABSTRACT

A vibration reduction system includes a base, a carrier element, and a plurality of actuator systems extending between the base and the carrier element, the plurality of actuator systems arranged to apply forces to the carrier element in multiple axes to reduce vibration of the carrier element, each actuator system of the plurality of actuator systems including a pneumatic actuator and an electric actuator.

24 Claims, 14 Drawing Sheets

(56) References Cited

U.S. PATENT DOCUMENTS

| | | | |
|---|---|---|---|
| 6,942,202 B2* | 9/2005 | Kienholz | F16F 15/0232 |
| | | | 267/140.14 |
| 6,953,109 B2 | 10/2005 | Watson et al. | |
| 6,987,559 B2 | 1/2006 | Phillips et al. | |
| 7,095,482 B2 | 8/2006 | Phillips et al. | |
| 7,726,452 B2 | 6/2010 | Kraner et al. | |
| 9,777,793 B1* | 10/2017 | Chen | G05B 19/402 |
| 11,638,995 B2* | 5/2023 | Abdallah | B25J 9/0084 |
| | | | 700/245 |
| 2003/0057619 A1* | 3/2003 | Ueta | G03F 7/709 |
| | | | 267/136 |
| 2009/0040638 A1 | 2/2009 | Van Deuren et al. | |
| 2012/0241268 A1 | 9/2012 | Laro et al. | |
| 2016/0207194 A1 | 7/2016 | Blood et al. | |
| 2017/0080576 A1* | 3/2017 | Abdallah | B25J 9/1015 |
| 2017/0221376 A1* | 8/2017 | Gosselin | B25J 17/0216 |
| 2017/0304946 A1* | 10/2017 | Shibazaki | B33Y 30/00 |
| 2019/0091877 A1* | 3/2019 | Park | B25J 19/02 |
| 2019/0120320 A1 | 4/2019 | Donaldson | |
| 2023/0317505 A1 | 10/2023 | Kuo et al. | |

OTHER PUBLICATIONS

Hanieh and Preumont, "Stiff and Soft Stewart Platforms for Active Damping and Active Isolation of Vibrations," Actuator 2002, 8th International Conference on New Actuators; Bremen, Germany: 254-257, Jun. 2002.

Lu et al., "Vibration Isolation and Energy Harvesting Integrated in a Stewart Platform with High Static and Low Dynamic Stiffness," Applied Mathematical Modeling 89: 249-267, Aug. 2020.

Preumont et al., "A Six-Axis Single Stage Active Vibration Isolator Based on Stewart Platform," Journal of Sound and Vibration 300.3-5" 644-661, Mar. 2007.

* cited by examiner

VIBRATION REDUCTION SYSTEM FOR PRECISION ROBOTICS APPLICATIONS

CROSS REFERENCE TO RELATED APPLICATION

This application claims the benefit of U.S. Provisional Patent Application No. 63/090,008, filed on Oct. 9, 2020, which is incorporated herein by reference in its entirety.

FIELD

The present disclosure pertains to systems and methods of damping/reducing vibrations transmitted from a robotic system to an end effector of the robotic system.

BACKGROUND

Positioning an end effector such as a gripper, an optical system, etc., of an industrial robot relative to a workpiece, and maintaining the end effector at a specified position with high precision, can be challenging due to vibrations transmitted to the end effector through the links of the robot or disturbance from the surrounding environment of the end effector. Accordingly, there exists a need for vibration isolation and/or reduction systems that can damp and/or reduce vibrations transmitted to an end effector from the robotic system to maintain the end effector at a specified position or to move the end effector along a specified trajectory in three-dimensional space.

SUMMARY

Certain embodiments of the disclosure pertain to systems and methods of controlling a position of an end effector of a robotic system using a vibration reduction system including one or more actuator systems to apply forces to the end effector. In a representative embodiment, a vibration reduction system comprises a base, a carrier element, and a plurality of actuator systems extending between the base and the carrier element. The plurality of actuator systems are arranged to apply forces to the carrier element in multiple axes to reduce vibration of the carrier element, and each actuator system of the plurality of actuator systems comprises a pneumatic actuator and an electric actuator.

In any or all of the disclosed embodiments, the pneumatic actuator comprises a pneumatic cylinder, and the electric actuator comprises a voice coil motor.

In any or all of the disclosed embodiments, actuator systems of the plurality of actuator systems are angled relative to a longitudinal axis of the vibration reduction system, and the pneumatic actuator and the electric actuator of each actuator system are arranged in parallel.

In any or all of the disclosed embodiments, the electric actuator of each actuator system is one of a plurality of electric actuators.

In any or all of the disclosed embodiments, the vibration reduction system is configured as a Stewart platform.

In any or all of the disclosed embodiments, the actuator systems are low stiffness actuator systems.

In any or all of the disclosed embodiments, the plurality of actuator systems are oriented in different directions.

In any or all of the disclosed embodiments, actuator systems of the plurality of actuator systems extend from a first position on the base toward different positions on the carrier element, or from a second position on the carrier element toward different positions on the base.

In any or all of the disclosed embodiments, the actuator systems are coupled to the base in first pairs, and coupled to the carrier element in second pairs comprising different actuator systems than the first pairs.

In any or all of the disclosed embodiments, pairs of actuator systems of the plurality of actuator systems are arranged as two sides of a triangle.

In any or all of the disclosed embodiments, pairs of actuator systems and the carrier element form triangular arrangements with vertices on the base, and pairs of actuator systems and the base form triangular arrangements with vertices on the carrier element.

In any or all of the disclosed embodiments, the carrier element is located between the base and an object coupled to the carrier element.

In another representative embodiment, a robotic system comprises an end effector coupled to a vibration reduction system configured according to any of the embodiments described herein.

In any or all of the disclosed embodiments, the end effector is at least a part of a laser beam machining optical system, a gripper, or a liquid applicator.

In another representative embodiment, a method comprises controlling forces applied to an end effector of a robotic system using a vibration reduction system configured according to any of the embodiments described herein.

In any or all of the disclosed embodiments, the electric actuator and the pneumatic actuator of each actuator system are coaxially aligned and act on the carrier element along a common axis.

In any or all of the disclosed embodiments, the pneumatic actuator of each actuator system comprises a pneumatic cylinder, and the electric actuator is positioned inside the pneumatic cylinder.

In another representative embodiment, a method comprises receiving data of a position of an end effector of a robotic system relative to a workpiece, the end effector being coupled to the robotic system by a vibration reduction system comprising a plurality of actuator systems extending between a base and a carrier element coupled to the end effector, the plurality of actuator systems being arranged to apply force to the carrier element in multiple axes, each of the actuator systems comprising a pneumatic actuator and an electric actuator. The method further comprises determining a position error based at least in part on the position data and a specified position, determining a force command based at least in part on the position error, applying force to the carrier element with the electric actuator of at least one of the actuator systems based at least in part on the force command, and applying force to the carrier element with the pneumatic actuator of at least one of the actuator systems based at least in part on the force command.

In any or all of the disclosed embodiments, the method further comprises filtering the force command to determine a high frequency component of the force command and a low frequency component of the force command, transmitting the high frequency component of the force command to the electric actuator of at least one of the actuator systems of the vibration reduction system, and transmitting the low frequency component of the force command to the pneumatic actuator of at least one of the actuator systems of the vibration reduction system.

In any or all of the disclosed embodiments, the method further comprises combining the low frequency component of the force command with a feedforward force command based at least in part on a direction of a gravitational force on the end effector.

In any or all of the disclosed embodiments, determining the force command further comprises combining the position error with a feedforward force command based at least in part on an acceleration associated with the specified position.

In another representative embodiment, a system comprises a robotic system, a vibration reduction system coupled to the robotic system, the vibration reduction system comprising a base, a carrier element, and a plurality of actuator systems extending between the base and the carrier element, the plurality of actuator systems arranged to apply forces to the carrier element in multiple axes to reduce vibration of the carrier element, each actuator system of the plurality of actuator systems comprising a pneumatic actuator and an electric actuator. The system further comprises an end effector coupled to the vibration reduction system, wherein the vibration reduction system and the end effector are movable by the robotic system.

In any or all of the disclosed embodiments, the pneumatic actuator comprises a pneumatic cylinder, a rolling diaphragm, or a bellows.

In any or all of the disclosed embodiments, the electric actuator comprises a voice coil motor, a piezoelectric motor, a linear motor, a stepper motor, a rotary electric motor and a leadscrew, a capstan drive, or rack and pinion.

In any or all of the disclosed embodiments, the plurality of actuator systems comprises at least three actuator systems.

In any or all of the disclosed embodiments, the plurality of actuator systems comprises six actuator systems.

In any or all of the disclosed embodiments, actuator systems of the plurality of actuator systems are angled relative to a longitudinal axis of the vibration reduction system.

In any or all of the disclosed embodiments, the pneumatic actuator and the electric actuator of each actuator system are arranged in parallel.

In any or all of the disclosed embodiments, the electric actuator of each actuator system is one of a plurality of electric actuators.

In any or all of the disclosed embodiments, a connecting member of the pneumatic actuator is coupled to the carrier element; and the plurality of electric actuators are coupled to the connecting member of the pneumatic actuator.

In any or all of the disclosed embodiments, the connecting member is coupled to the carrier element by a spherical bearing.

In any or all of the disclosed embodiments, the vibration reduction system is configured as a Stewart platform.

In any or all of the disclosed embodiments, the actuator systems are low stiffness actuator systems.

In any or all of the disclosed embodiments, a robotic system is comprised of an end effector coupled to the vibration reduction system.

In any or all of the disclosed embodiments, the end effector is at least part of a laser beam machining optical system, a gripper, or a liquid applicator.

In any or all of the disclosed embodiments, the plurality of actuator systems are oriented in different directions.

In any or all of the disclosed embodiments, actuator systems of the plurality of actuator systems extend from a first position on the base toward different positions on the carrier element, or from a second position on the carrier element toward different positions on the base.

In any or all of the disclosed embodiments, the actuator systems are coupled to the base in first pairs, and coupled to the carrier element in second pairs comprising different actuator systems than the first pairs.

In any or all of the disclosed embodiments, pairs of actuator systems of the plurality of actuator systems are arranged as two sides of a triangle.

In any or all of the disclosed embodiments, pairs of actuator systems and the carrier element form triangular arrangements with vertices on the base.

In any or all of the disclosed embodiments, pairs of actuator systems and the base form triangular arrangements with vertices on the carrier element.

In any or all of the disclosed embodiments, the carrier element is located between the base and an object coupled to the carrier element.

In another representative embodiment, a vibration reduction system comprises a base, a carrier element, and a plurality of low stiffness actuator systems extending between the base and the carrier element, the plurality of low stiffness actuator systems arranged to apply forces to the carrier element in multiple axes to control a position of the carrier element and reduce vibration of the carrier element.

In another representative embodiment, a system comprises an end effector, and a vibration reduction system coupled to the end effector. The vibration reduction system comprises a base, a carrier element, and a plurality of actuator systems extending between the base and the carrier element, the plurality of actuator systems arranged to apply forces to the carrier element in multiple axes to reduce vibration of the carrier element, each actuator system of the plurality of actuator systems comprising a pneumatic actuator and an electric actuator.

In another representative embodiment, a system comprises a robotic system, and a vibration reduction system coupled to the robotic system. The vibration reduction system comprises a base, a carrier element, and a plurality of actuator systems extending between the base and the carrier element, the plurality of actuator systems arranged to apply forces to the carrier element in multiple axes to reduce vibration of the carrier element, each actuator system of the plurality of actuator systems comprising a pneumatic actuator and an electric actuator, and an end effector coupled to the vibration reduction system, wherein the vibration reduction system and the end effector are movable by the robotic system.

In another representative embodiment, a method comprises receiving data of a position of an end effector of a robotic system relative to a workpiece, the end effector being coupled to the robotic system by a vibration reduction system comprising a plurality of actuator systems configured to apply force to the end effector in multiple axes, each of the actuator systems comprising a pneumatic actuator and an electric actuator. The method further comprises determining a position error based at least in part on the position data and a specified position, determining a force command based at least in part on the position error, filtering the force command to determine a high frequency component of the force command and a low frequency component of the force command, transmitting the high frequency component of the force command to the electric actuator of at least one of the actuator systems of the vibration reduction system so that the electric actuator applies force to the end effector, and transmitting the low frequency component of the force command to the pneumatic actuator of at least one of the actuator systems of the vibration reduction system so that the pneumatic actuator applies force to the end effector.

In any or all of the disclosed embodiments, determining the force command further comprises combining the position error with a feedforward force command based at least in part on an acceleration associated with the specified position.

In any or all of the disclosed embodiments, the method comprises combining the low frequency component of the force command with a feedforward force command based at least in part on a direction of a gravitational force on the end effector.

In any or all of the disclosed embodiments, transmitting the low frequency component of the force command further comprises determining a pressure control signal based at least in part on the low frequency component of the force command.

In any or all of the disclosed embodiments, transmitting the high frequency component of the force command further comprises converting the high frequency component of the force command to a proportional electric current.

In another representative embodiment, a method comprises controlling forces applied to an end effector of a robotic system using a Stewart platform coupled to the end effector to reduce vibration of the end effector, the Stewart platform comprising a plurality of actuator systems, each of the actuator systems comprising a pneumatic actuator and an electric actuator.

In another representative embodiment, a Stewart platform comprises a plurality of actuator systems configured to reduce vibration of a top plate of the Stewart platform, wherein each of the actuator systems comprises a pneumatic actuator and an electric actuator.

In another representative embodiment, a system comprises a vibration reduction system coupled to an end effector. The vibration reduction system comprises a base, a carrier element, and a plurality of actuator systems extending between the base and the carrier element, the plurality of actuator systems arranged to apply forces to the carrier element in multiple axes to reduce vibration of the carrier element, each actuator system of the plurality of actuator systems comprising a pneumatic actuator and an electric actuator. The system further comprises a controller configured to determine a position error of the carrier element based at least in part on data of a position of the carrier element relative to a workpiece, determine a force command based at least in part on the position error, filter the force command to determine a high frequency component of the force command and a low frequency component of the force command, transmit the high frequency component of the force command to the electric actuator of at least one of the actuator systems of the vibration reduction system so that the electric actuator applies force to the carrier element, and transmit the low frequency component of the force command to the pneumatic actuator of at least one of the actuator systems of the vibration reduction system so that the pneumatic actuator applies force to the carrier element.

In another representative embodiment, an active vibration reduction system comprises a base, a carrier element, and an actuator system arranged between the base and the carrier element, which applies force to the carrier element to damp vibrations and which has a pneumatic actuator and an electric actuator.

In another representative embodiment, an active vibration reduction system comprises a base, a carrier element, and an actuator system arranged between the base and the carrier element, which applies force to the carrier element to control a position of the carrier element and damps vibrations, wherein the actuator system has a stiffness less than or equal to 150 N/mm.

The foregoing and other objects, features, and advantages of the disclosed technology will become more apparent from the following detailed description, which proceeds with reference to the accompanying figures.

DETAILED DESCRIPTION

Certain embodiments of the disclosure pertain to systems and methods of damping and/or reducing vibration transmitted to an end effector of a robotic system through the links and/or members of the robotic system. In this context, vibration includes both "steady state" periodic oscillations as well as transient or irregular disturbances. As used herein in the context of vibration reduction, the term "reduce" includes the term "substantially reduce," the term "reduction" includes the term "substantial reduction," and each of these terms encompasses vibration isolation. Thus, the vibration reduction systems described herein can also be referred to as vibration isolation systems. In certain embodiments, the vibration reduction systems described herein can comprise a two-plate manipulator (e.g., a parallel plate manipulator) with a plurality of actuator systems, members, and/or struts extending between a first plate and/or base and a second plate and/or carrier element in the manner of a Stewart platform. In certain embodiments, the actuator systems can extend between the base and the carrier element at an angle such that the actuator systems acting separately and/or together can apply force and/or moment to the carrier element along multiple axes, allowing movement and/or vibration damping of the carrier element in multiple degrees of freedom. For example, in certain embodiments the actuator systems can be mounted to discrete mounting locations on the base and to discrete mounting locations on the carrier element that are angularly offset from those of the base. In certain embodiments, at least one of the actuator systems, a plurality of the actuator systems, or all of the actuator systems can comprise one or a plurality of pneumatic actuators in parallel with one or a plurality of electric actuators. In certain embodiments, a control system of the vibration reduction system can apply low frequency active force control with the pneumatic actuators and higher frequency active force control with the electric actuators. This can allow the system to damp and/or reduce (e.g., actively and/or passively) vibration over a relatively wide frequency range. This can also allow the system to correct for positional errors of the carrier element, or an end effector coupled to the carrier element, to maintain the carrier element and/or end effector at a specified position with a high degree of accuracy.

Example 1: Vibration Reduction System

Figure 1:
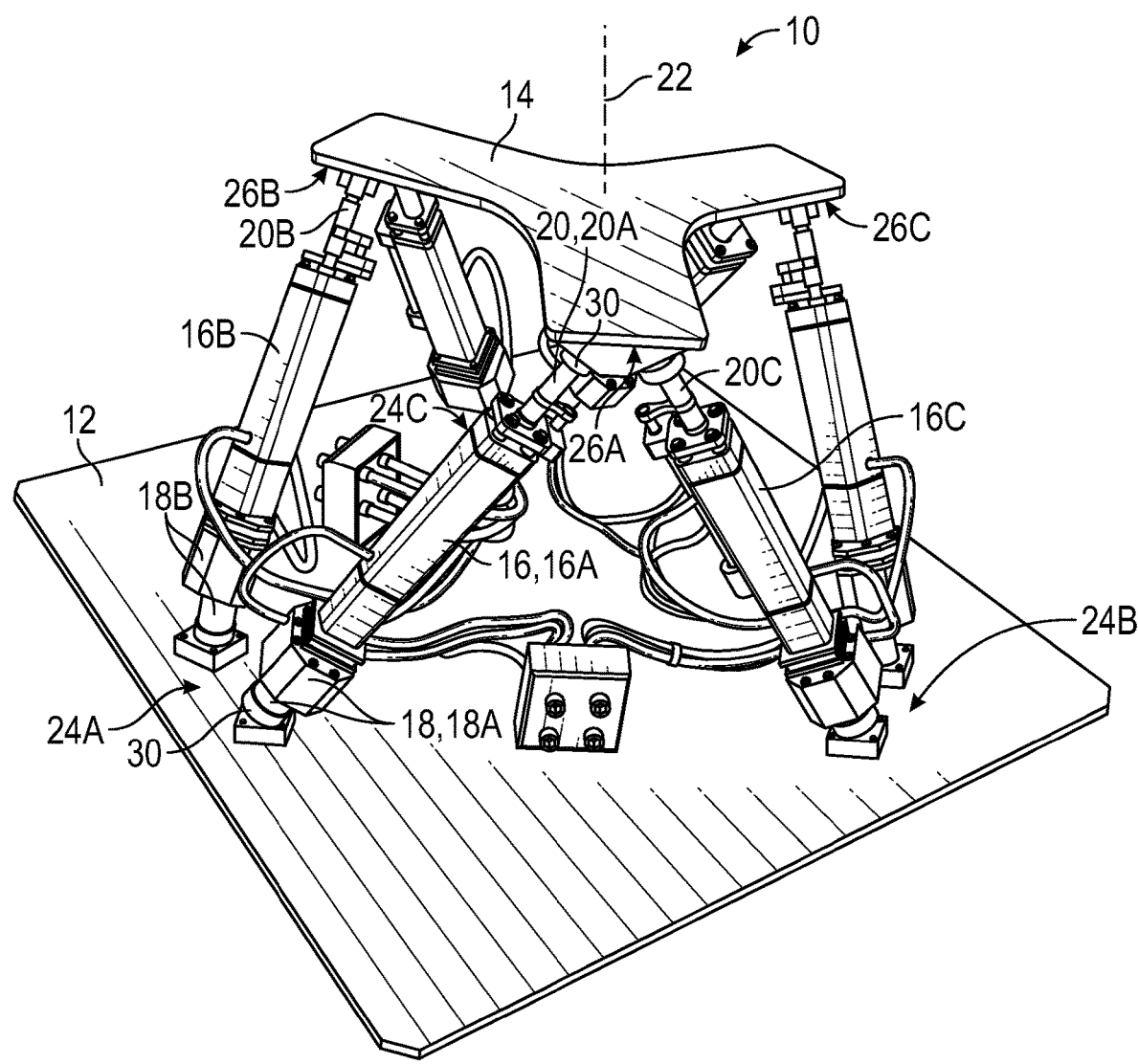
FIG. 1 illustrates a vibration reduction system, according to one embodiment.

FIG. 1 illustrates a representative example of a vibration reduction system or vibration isolation system (VI system) 10, according to one embodiment. In certain embodiments, the vibration reduction system 10 can be configured as a parallel manipulator including one or a plurality of degrees of freedom. In the illustrated embodiment, the vibration reduction system 10 is configured as a Stewart platform (also referred to as a Gough-Stewart platform and a hexapod) comprising a first or base member and/or plate referred to herein as a base 12, and a second or top member and/or plate referred to herein as a carrier element 14. In certain embodiments, the carrier element 14 can be configured to mount an end effector of a robotic system. In certain embodiments, the carrier element 14 can be incorporated into the structure or body of the end effector (e.g., as part of a housing of the end effector), depending upon the particular application. The carrier element 14 can also have any shape, including a tri-blade shape as shown in FIG. 1, a round or circular shape, a rectangular shape, etc. In certain embodiments, the base 12 and/or the carrier element 14 can be planar members.

The system 10 can comprise a plurality of actuators/ actuator units/actuator members/vibration damping members and/or struts referred to herein as actuator systems 16. The actuator systems 16 can extend between the base 12 and the carrier element 14 to couple the base 12 to the carrier element 14. The actuator systems 16 can comprise first end portions 18 coupled to the base 12 and second end portions 20 coupled to the carrier element 14. In certain embodiments, any or all of the first and/or second end portions 18, 20 can comprise multi-axial joints 30, which can be configured as flexures, universal joints, spherical bearings, ball joints, etc., to permit rotation of the end portions in any direction, or in specified directions.

In certain embodiments, the system 10 can include at least three actuator systems 16. In the illustrated embodiment, the system 10 comprises six actuator systems 16, although the system can include more or fewer actuator systems depending upon the particular application. The actuator systems 16 can be angled relative to a longitudinal axis 22 of the system 10 extending from (e.g., perpendicular to) the base 12 and passing through the carrier element 14. In this manner, the actuator systems can be oriented in different directions, and can apply force and/or moment to the carrier element along multiple axes (e.g., the longitudinal axes of the actuator systems 16). End portions of the actuator systems 16 can also be mounted to the base 12 and the carrier element 14 in pairs.

For example, the first end portions 18 of the actuator systems 16 can be mounted to three mounting locations 24A-24C on the base 12, and the second end portions 20 can be mounted to three mounting locations 26A-26C on the carrier element 14 that are angularly offset from the mounting locations 24A-24C on the base relative to the longitudinal axis 22 (e.g., by 60° in the illustrated embodiment). Thus, for example, the first end portion 18A of an actuator system 16A can be mounted to the mounting location 24A on the base 12 adjacent or substantially co-located with the first end portion 18B of an actuator system 16B. The second end portion 20A of the actuator system 16A is mounted to a location 26A on the carrier element 14 that is angularly offset from the mounting location 24A (e.g., by 60°) in a first rotational direction, together with the second end portion 20C of an actuator system 16C that is angled toward the actuator 16A. The second end portion 20B of the actuator system 16B can be mounted to a location 26B on the carrier element 14 that is angularly offset from the mounting location 24A of the base in a second rotational direction opposite the first rotational direction. In this manner, the longitudinal axes of the two actuator systems 16 mounted at each mounting location 24A-24C on the base 12 can diverge in a direction toward the carrier element, and the longitudinal axes of the actuator systems mounted together at each mounting location 26A-26C on the carrier element 14 can diverge in a direction toward the base 12. The actuator systems can also form first pairs of actuator systems coupled to the base 12 at the mounting locations 24A-24C on the base, and second pairs coupled to the carrier element 14 at the mounting locations 26A-26C, where the first pairs and the second pairs comprise different actuators. The actuator systems can also form downwardly oriented triangular arrangements in combination with the carrier element 14 having vertices at the mounting locations 24A-24C on the base, and upwardly oriented triangular arrangements in combination with the base 12 having vertices at the mounting locations 26A-26C on the carrier element. In certain embodiments, actuator systems extend from a first position and/or location on the base toward different positions on the carrier element, and/or from a second position and/or location on the carrier element toward different positions on the base.

Figure 2:
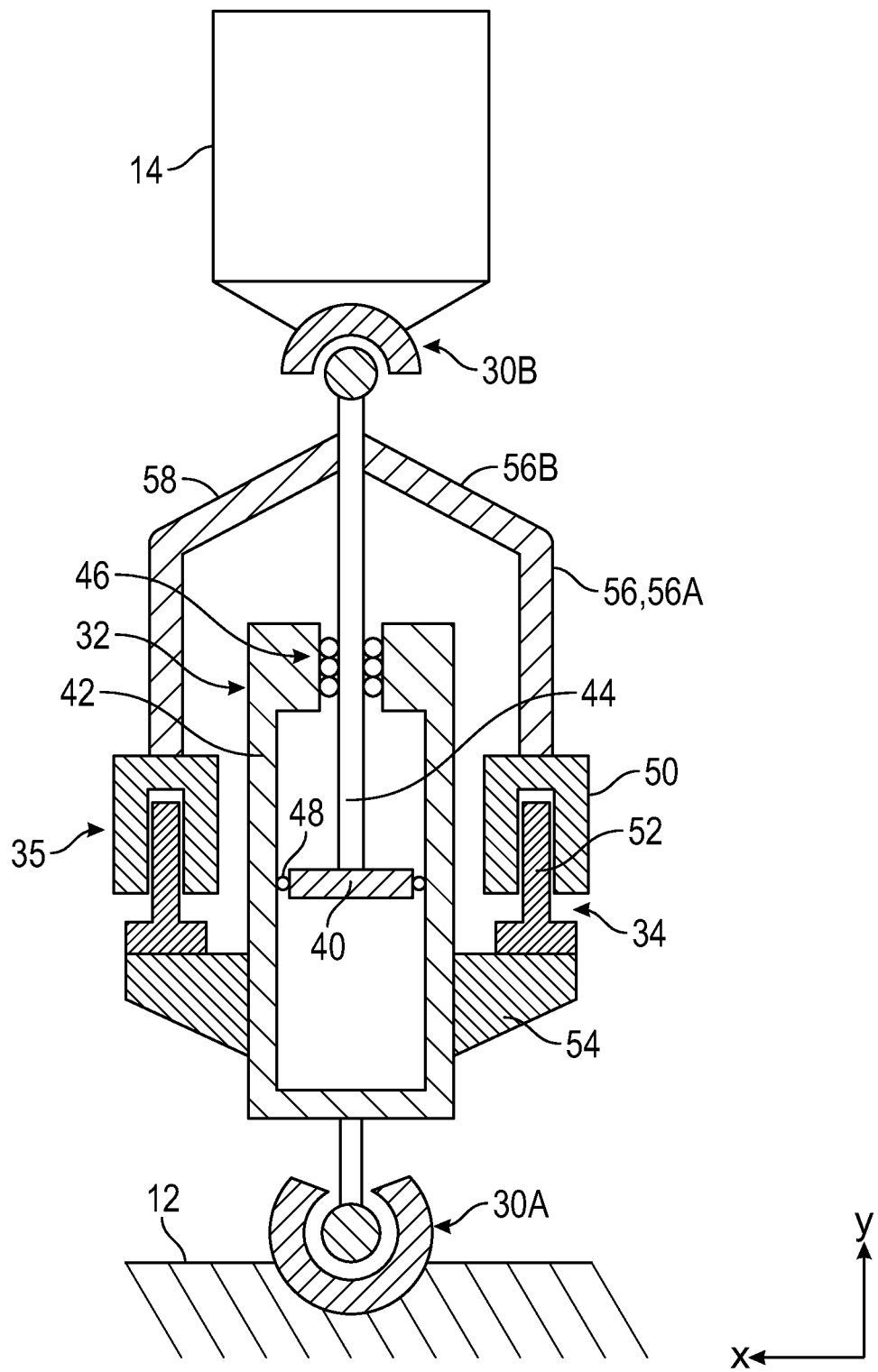
FIG. 2 illustrates an actuator system of the vibration reduction system of FIG. 1, according to one embodiment.

In certain embodiments, the actuator systems 16 can comprise one or a plurality of different types of actuators arranged in parallel and/or in series, depending upon the particular requirements of the system. For example, FIG. 2 illustrates a representative example of an actuator system 16 including a first actuator 32 in parallel with a second actuator 34 and a third actuator 35. In certain embodiments, any or all of the actuators 32, 34, and/or 35 can be controlled together, independently, or in any combination, to control the length and/or force and/or moment applied by the actuator system 16 acting between the carrier element 14 and the base 12.

In certain embodiments, the first actuator 32 can be a low-stiffness spring-like element. In certain embodiments, the first actuator 32 can utilize a compressed liquid or gas in a chamber, such as a cylinder, a bellows, a diaphragm, a balloon, etc. For example, in certain embodiments the first actuator 32 can be a pneumatic actuator/pneumatic spring/ gas spring/air spring/air suspension/gas suspension such as a pneumatic cylinder, a flexible bellows, a volume enclosed by a flexible membrane, a rolling diaphragm, etc. The force exerted by the first actuator 32 can be controlled by varying the pressure of the liquid or gas in the chamber and/or cylinder of the actuator. For example, in the illustrated embodiment the first actuator 32 can be a pneumatic actuator configured as a pneumatic cylinder comprising a piston 40 movable in a cylinder 42. The cylinder 42 can be coupled to the base 12 by a joint, such as a universal joint configured as a spherical bearing and/or ball joint 30A. A connecting member configured as a rod 44 of the piston 40 can be coupled to a second spherical bearing/ball joint 30B coupled to the carrier element 14. In certain embodiments, the ball joints 30A, 30B can be designed to support a low or zero moment (e.g., they rotate freely). Thus, in certain embodiments the primary (or only) force that can act through actuator 16 between the carrier element 14 and the base 12 is an axial force along a line connecting the centers of the ball joints 30A, 30B.

The connecting member 44 can pass through a guide bearing and/or seal assembly 46 formed as part of the cylinder 42. One or a plurality of seals configured as piston rings 48 can form a seal with the walls of the cylinder 42. Longitudinal motion of the piston 40 and/or the connecting member 44 relative to the cylinder 42 can change the length of the actuator system 16, and thus the position and/or orientation of the carrier element 14 relative to the base 12. Varying the pressure in the cylinder 42 (e.g., on one or both sides of the piston 40 through one or a plurality of valves and/or ports) can change the force applied by the pneumatic actuator 32 to the carrier element 14. In certain embodiments, the first actuator 32 can have a low mechanical stiffness and damping. In certain embodiments, the actuator force can depend primarily on the pressure in the cylinder, and not on the length of the actuator system 16. When the position and/or orientation of the carrier element 14 changes relative to the base 12, the piston 40 and/or the connecting member 44 can move longitudinally relative to the cylinder 42, thereby changing the length of the actuator system 16 while the control system (e.g., FIG. 3) maintains a constant pressure in the cylinder 42.

In certain embodiments, the second actuator 34 can be an electric actuator such as a voice coil motor, a linear motor, a piezoelectric actuator/motor, a stepper motor, a linear servo motor, a solenoid, a variable reluctance actuator, a rotary electric motor and a leadscrew, a capstan drive, or a rack and pinion, or any other type of electric actuator. The force applied to the carrier element 14 by the electric actuator 34 can be controlled by varying the voltage and/or current supplied to the electric actuator. For example, in FIG. 2 the electric actuator 34 is configured as a voice coil motor including a magnet assembly/yoke 50 and a coil assembly/member 52 disposed within the magnet assembly. In the illustrated embodiment, the electric actuator 34 (e.g., the coil assembly 52) is mounted to the cylinder 42 of the pneumatic actuator 32, such as on a mounting portion configured as a flange 54. In the illustrated embodiment, the magnet assembly 50 can be movable relative to the coil assembly 52, although in other embodiments the arrangement can be reversed such that the coil assembly is the movable element of the motor.

The electric actuator 34 can be coupled to the carrier element 14 by a member 56 coupled to and extending from the magnet assembly 50. A first portion 56A of the member 56 can extend along the y-axis in FIG. 2, and a second portion 56B of the member can be angled inwardly and coupled to the connecting member 44 between the guide bearing 46 and the joint 30B. Force developed and/or applied between the magnet assembly 50 and the coil assembly 52 of the electric actuator 34 can be transmitted along the member 56 and applied to the connecting member 44, and thereby to the carrier element 14.

In the illustrated embodiment, the actuator system 16 can comprise a third actuator 35, which can be configured as a second electric actuator. In certain embodiments, the electric actuator 35 can be configured similarly to the electric actuator 34, and can be coupled to the pneumatic actuator 32 on the opposite side of the cylinder 42 from the electric actuator 34 (e.g., on the flange 54). An angled member 58 can couple the electric actuator 35 to the connecting member 44 at, for example, the same or approximately the same longitudinal location as the member 56. Accordingly, force developed and/or produced by the electric actuator 35 can be applied to the carrier element 14 via the connecting member 44. In certain embodiments, the current and/or voltage supplied to each electric actuator 34, 35 can be equal so the net force produced by the electric actuators 34, 35 acts along the axis of the actuator system 16 that connects the ball joints 30A, 30B.

In certain embodiments, the actuator systems 16 can have relatively low stiffness, such as less than or equal to 150 N/mm, less than or equal to 100 N/mm, less than or equal to 80 N/mm, from 10 N/mm to 150 N/mm, from 10 N/mm to 100 N/mm, from 10 N/mm to 80 N/mm, etc. As used herein, a "low stiffness actuator system" refers to an actuator system with a stiffness of less than or equal to 150 N/mm, less than or equal to 100 N/mm, less than or equal to 80 N/mm, from 10 N/mm to 150 N/mm, from 10 N/mm to 100 N/mm, or from 10 N/mm to 80 N/mm. In certain embodiments, the actuator systems can also have a lower stiffness than the base. In certain embodiments, one or more actuator systems may have different stiffnesses, and one or more actuator systems need not be low stiffness actuator systems as defined above (e.g., one or more actuator systems can have stiffness ranges greater than the ranges given above).

Figure 16:
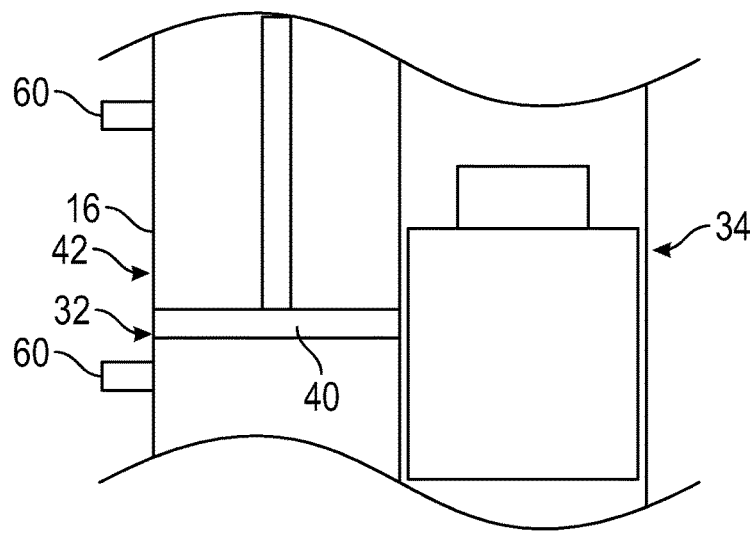
FIG. 16 is a schematic diagram of another embodiment of an actuator system.

In other embodiments, the actuator systems 16 can include more or fewer actuators of any specified type. For example, in certain embodiments the actuator systems 16 can include more than two electric actuators, such as three electric actuators, four electric actuators, etc., arrayed around a central pneumatic actuator. In certain embodiments, the actuator systems 16 can include one pneumatic actuator and one electric actuator in parallel. Such a configuration is shown in FIG. 16, which illustrates a pneumatic actuator 32 in parallel with an electric actuator 34 configured as a voice coil motor. In certain embodiments, the cylinder 42 of the pneumatic actuator can include valves or ports 60 on both sides of the piston 40 to vary the pressure on both sides of the piston. The actuator systems 16 can also include other elements in combination with the actuators, such as dampers. The actuator systems 16 can also include any of various sensors such as accelerometers, position sensors such as encoders, temperature sensors, pressure sensors (e.g., incorporated into the pneumatic actuators), load cells/force transducers, etc.

Figure 18:
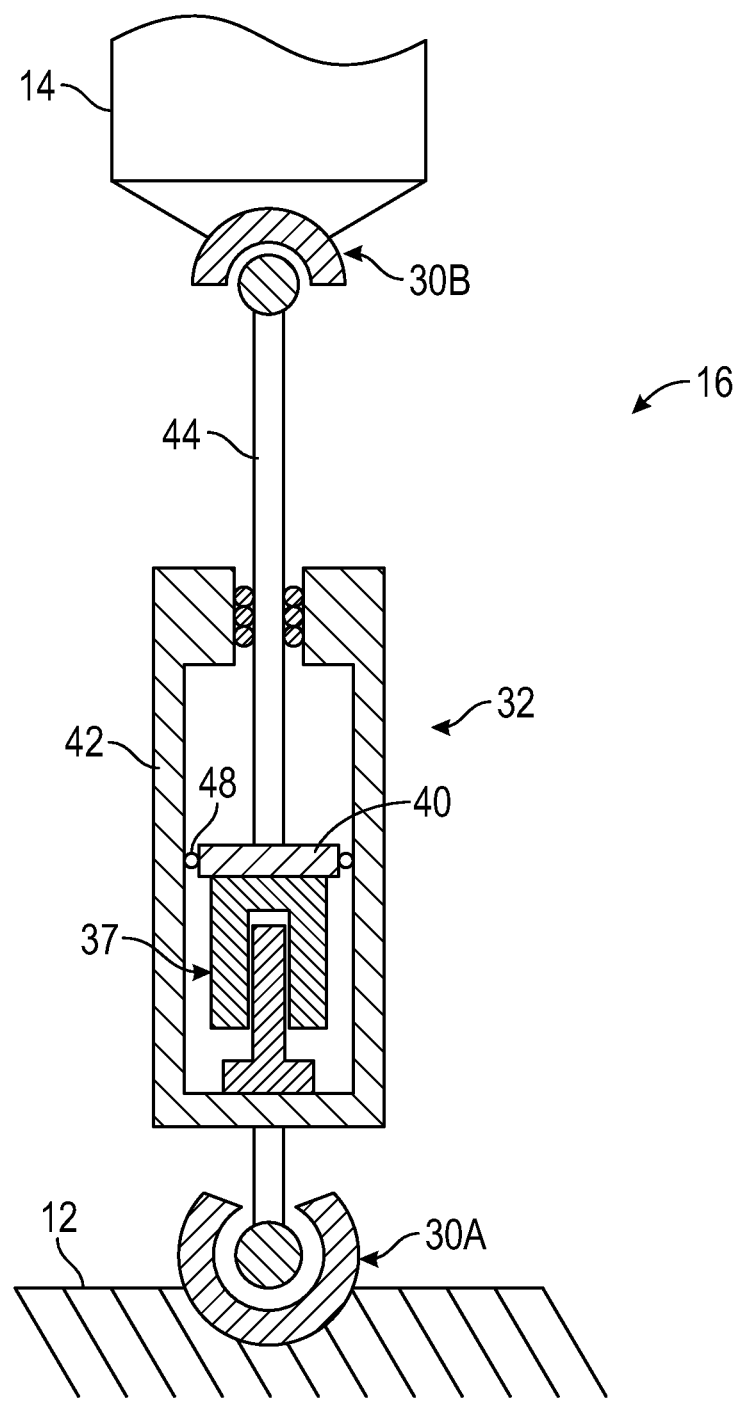
FIG. 18 illustrates another embodiment of an actuator system in which an electric actuator is incorporated into a pneumatic actuator.

FIG. 18 illustrates yet another embodiment of an actuator system 16 comprising an electric actuator 37 (e.g., a voice coil motor) arranged in series with the pneumatic actuator 32 such that the electric actuator and the pneumatic actuator are coaxially aligned and act on the carrier element 14 along a common axis. In the embodiment of FIG. 18, the electric actuator 37 is located inside the cylinder 42 and acts between the cylinder end wall and the piston 40. In embodiments in which the electric actuator is a voice coil motor, the coil assembly or the magnet assembly (depending on the orientation) can be integrally formed with the piston head such that they are a unitary body. The coil assembly or the magnet assembly can also be integrally formed with the end wall of the cylinder 42. In certain embodiments, locating the electric actuator 37 within the pneumatic actuator 32 can allow the cylinder 42 (and the associated interior gas volume) to be relatively larger for a given actuator system footprint, advantageously resulting in reduced stiffness. Such a configuration can also require fewer parts and can have a lower overall mass. In other embodiments, the electric actuator 37 can be positioned outside the pneumatic actuator (e.g., above or below the cylinder of the pneumatic actuator).

Example 2: Control System for Vibration Reduction System

The following example proceeds with reference to a vibration reduction system with actuator systems configured according to the embodiment of FIG. 2, but can be applicable to vibration reduction systems including any of the actuator systems described herein, such as the actuator systems of FIGS. 16 and 18. By varying the lengths of the various actuators 32, 34, and/or 35, the length of a given actuator system 16 (and thereby the position and/or orientation of the carrier element 14) can be varied. By varying the lengths of the various actuator systems 16, the carrier element 14 can be moved in six degrees of freedom (e.g., translation along the x-axis, y-axis, and/or z-axis, and/or rotation about the x-axis, y-axis, and/or z-axis). By varying the force produced/applied/exerted by the various actuators 32, 34, and/or 35, the total force applied to the carrier element by an actuator system 16 can be varied. By varying the force applied or exerted by the various actuator systems 16 to the carrier element 14, the carrier element 14 can be accelerated in six degrees of freedom. Thus, the actuator systems can damp vibration, and control the position of the carrier element 14 by maintaining the carrier element 14 at a specified position and/or orientation. The actuator systems can also move the carrier element 14 along a specified trajectory with a high degree accuracy and free or substantially free of errors or disturbances caused by vibration and/or motion of the base 12.

For example, in certain embodiments the force applied to the carrier element 14 by each actuator system 16 can be given by:

$$\{F\}_{act} = ([J]^T)^{-1} \{F\}_x$$

In the above equation, $([J]^T)^{-1}$ is the inverse of the transpose of the Jacobian matrix of the system 10. The Jacobian matrix for a hexapod system with six actuator systems can be defined as:

$$[J] = \left[\frac{\partial act}{\partial x}\right] = \begin{bmatrix} \frac{\partial act_1}{\partial x} & \cdots & \frac{\partial act_1}{\partial \gamma} \\ \cdots & \cdots & \cdots \\ \frac{\partial act_6}{\partial x} & \cdots & \frac{\partial act_6}{\partial \gamma} \end{bmatrix}$$

The vector $\{F\}_x$ can be defined as:

$$F = \begin{matrix} F_x \\ F_y \\ F_z \\ M_x \\ M_y \\ M_z \end{matrix}$$

Figure 3:
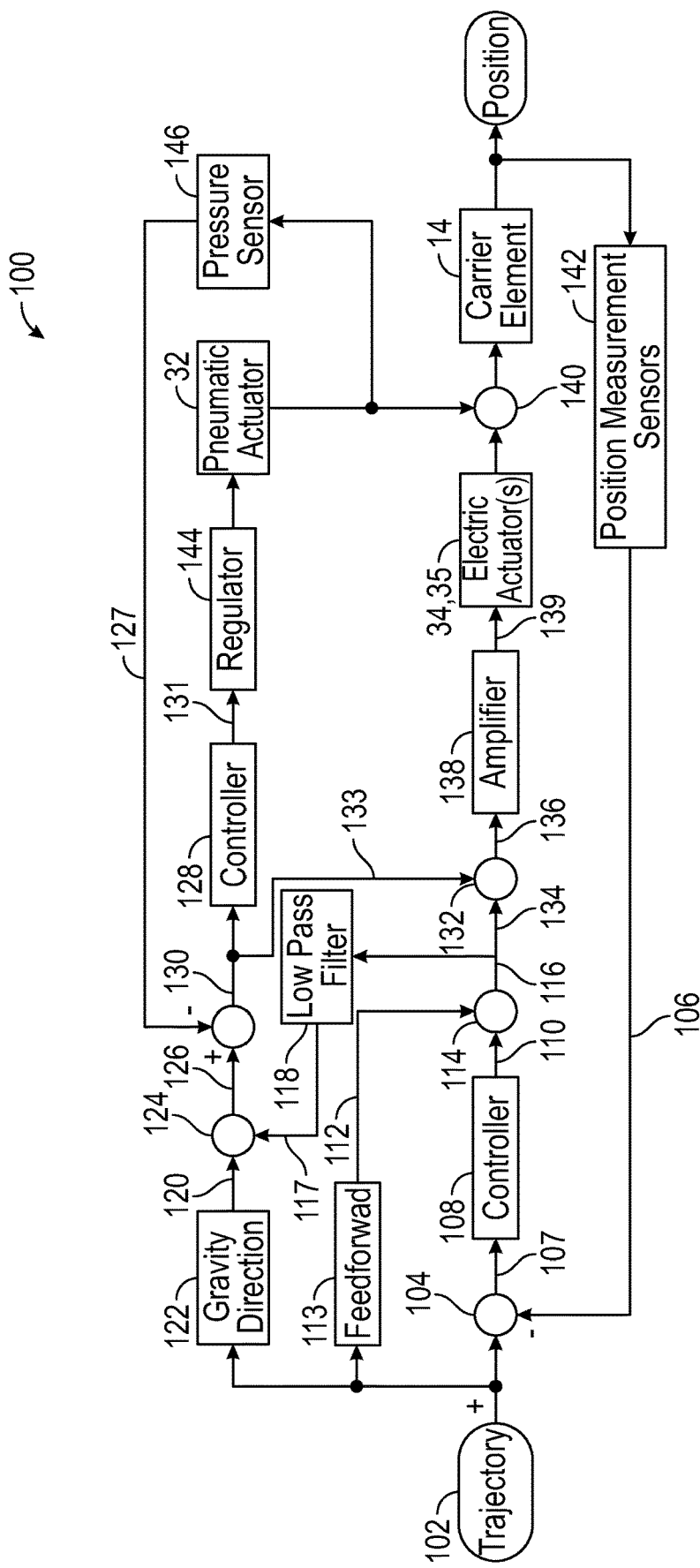
FIG. 3 is a schematic block diagram of a representative control system for implementing the vibration reduction methods described herein.

In certain embodiments, the system 10 can be controlled to control the position and/or orientation of the carrier element 14, and/or to damp vibration transmitted to the carrier element, by controlling the force applied to the carrier element by the first, second, and/or third actuators (or more) of each actuator system 16. FIG. 3 illustrates a representative embodiment of a control system 100 for a representative actuator system 16 including a first actuator configured as a pneumatic actuator 32 such as a pneumatic cylinder or bellows, and one or more second actuator(s), such as two electric actuators 34, 35 configured as voice coil motors. For purposes of this example, the electric actuators 34 and 35 are controlled using the same force command, but the electric actuators 34 and 35 can also be controlled independently with different force commands to produce different forces and/or to operate at different frequencies.

At block 102, data of a trajectory or specified position of the carrier element 14, an end effector coupled to the carrier element 14, etc., can be provided to the control system. At a summing junction 104, the trajectory/specified position can be combined with measured position data 106 of the carrier element and/or end effector from a feedback loop (e.g., as negative feedback). Error data or an error signal 107 of the trajectory and/or position can be provided to a controller element 108, which can apply any of proportional, integral, and/or derivative (PID) control, lead-lag compensation, analog and/or digital filters, etc., to output a feedback force command 110. In certain embodiments, the controller element 108 can be a proportional-integral-lead ("PI-Lead") controller, although other controller combinations/techniques can be implemented.

The feedback force command 110 can be summed/combined with a first feedforward force command 112 at a summing junction 114. In certain embodiments, the feedforward force command 112 can be an acceleration feedforward force command provided by a feedforward force command module 113. The feedforward force command module 113 can multiply the inertia of the carrier element 14 by the acceleration (e.g., the second derivative with respect to time) of the trajectory 102. In some embodiments the command 112 can also include terms based on the velocity, jerk, timing, and/or position of trajectory 102. The resulting force command 116 can be filtered by a low-pass filter 118 to filter a low-frequency component of the force command from a higher-frequency component of the force command. In certain embodiments, the frequency of the low frequency force command can be 1 Hz to 100 Hz, 1 Hz to 50 Hz, 1 Hz to 40 Hz, 1 Hz to 30 Hz, less than or equal to 100 Hz, less than or equal to 50 Hz, less than or equal to 40 Hz, etc. In certain embodiments, the frequency of the high frequency component of the force command can be 1 Hz to 200 Hz, 1 Hz to 100 Hz, 1 Hz to 50 Hz, 10 Hz to 50 Hz, 50 Hz to 200 Hz, 100 Hz to 200 Hz, greater than or equal to 200 Hz, greater than or equal to 100 Hz, greater than or equal to 50 Hz, etc. As explained in greater detail below, the low-frequency component of the force command can be provided to the pneumatic actuator 32, while the high-frequency component can be provided to the electric actuators 34 and 35.

For example, in particular embodiments a low-frequency component 117 of the force command 116 can be summed with a second feedforward force command 120 at a summing junction 124. In certain embodiments, the second feedforward force command 120 can be determined based at least in part on the direction of the gravitational force on the end effector coupled to the vibration reduction system 10, which can be determined by a gravity direction determination module 122. A force command 126 (or pressure command) can be determined based at least in part on the sum of the low-frequency component 117 of the force command 116 and the second feedforward force command 120, yielding a force command 126. The force command 126 can be combined with data or a signal 127 indicative of a measured force applied by the pneumatic actuator 32 (e.g., as negative feedback), resulting in error data or an error signal 130 of the force applied by the pneumatic actuator 32. The measured force signal 127 can be determined based at least in part on the pressure in the pneumatic actuator 32, which can be measured by a pressure sensor 146.

The pneumatic actuator force error signal 130 can be transmitted and/or provided to a controller element 128 (e.g., a PI controller or a PID controller) which can apply any of proportional, integral, and/or derivative control, and/or digital or analog filtering to the signal to produce a pressure control signal 131. The pressure control signal 131 can be transmitted to a pressure regulator 144 of the first actuator 32, which can vary the pressure in the chamber of the first/pneumatic actuator accordingly to apply force to the carrier element 14 in accordance with the pressure control signal 131.

Returning to the force command 116, a high-frequency component 134 of the force command 116 can continue to a summing junction 132, where it can be summed with the pneumatic actuator force error signal 130 (also represented as force signal 133). As shown in FIG. 3, in certain embodiments the high-frequency component 134 can be the same as force command 116; in other embodiments, an additional high-pass filter, which can be the complementary filter to the low pass filter 118 or another filter design, can be used to generate the high-frequency component 134 from force command 116. The resulting electric actuator force command 136 (e.g., a current command or current signal) can be converted to a proportional electric current 139 (e.g., amplified) with an amplifier 138, and provided to the electric actuators 34 and 35, which in certain embodiments can be voice coil motors or other electric motors, as noted above. The electric actuators 34 and 35 can output force proportional to the input electrical current 139. The forces generated by the pneumatic actuator 32 and the electric actuators 34 and 35 can be combined, as represented by the summing junction 140, as the force output of the actuator system 16. This combined force output can act on the carrier element 14 resulting in motion along the trajectory 102 without being influenced by vibration, disturbance, or motion of the base 12 (e.g., resulting in vibration damping, position maintenance, and/or repositioning of the carrier element according to the position/trajectory data 102 provided). Data of the position of the carrier element 14 and/or of an end effector coupled to the carrier element can be determined by one or a variety of sensors indicated generally at block 142. Such sensors can include, for example, accelerometers, position encoders, optical time-of-flight sensors, etc., configured to measure the distance between the carrier element and/or end effector and the workpiece surface, and/or the distance between the carrier element and/or end effector and a reference point on a robotic system to which the system 10 is coupled. The sensors can also measure the acceleration or velocity of the carrier element 14 in an inertial reference frame.

In certain embodiments, a control system such as the control system 100 can be implemented for each of the actuator systems 16 of the vibration reduction system 10. In certain embodiments, the functions of one or more of the control elements of the system 100 can be combined, and/or the functions of one or more control elements can be performed by a single controller for multiple different actuator systems 16.

Any or all of the vibration reduction systems described herein can provide one or more significant advantages over existing vibration reduction systems. For example, the hexapod/Stewart platform vibration reduction system 10 can provide for precise control and/or vibration damping and/or reduction of an end effector and/or payload coupled to the system 10 in six degrees of freedom (e.g., three-dimensional space), and at any orientation relative to a workpiece, without disturbance from vibration of the base 12. Additionally, the parallel, actively controllable actuators (e.g., actuators 32, 34, and/or 35) of the actuator systems 16 can allow for accurate force control (e.g., active damping, and/or reduction of vibrations/disturbances) of the carrier element in frequency ranges specifically suited to each type of actuator. For example, by determining the low-frequency and high-frequency components of the error signals and forces applied to the carrier element and/or end effector, the control system 100 can control the pneumatic actuators to apply relatively low-frequency force to the carrier element, while the faster response time of the electric actuators can be used to control higher frequency force components (e.g., to damp higher frequency vibrations). This can allow an end effector coupled to the system 10 to maintain a selected position with an accuracy of 100 µm or less, 50 µm or less, or 10 µm or less. In certain embodiments, the low mechanical stiffness of the actuator systems 16 can also passively reduce high frequency vibrations and/or isolate the carrier element 14 from high frequency vibrations (e.g., of the base 12).

The control system 100 can also compensate for pressure and/or positional errors of the pneumatic actuators, which can have longer response times in certain embodiments, by accounting for such errors when determining the force commands of the electric actuators. The pressure and/or positional errors of the pneumatic actuators can be force control errors, and/or bias errors associated with forces applied by, for example, utility conduits coupled to the end effector such as electrical cables, hoses, etc. As indicated in FIG. 3 by force signal 133, certain implementations can, by directing at least the high frequency components of pneumatic command 130 to summing junction 132, reduce short term transient force errors of the pneumatic actuators. This can result in a reduction of steady state operation of the electric actuators and associated heat generation (e.g., when an end effector coupled to the carrier element is stationary or moving slowly).

In certain implementations, by directing the low-frequency components of the force command 116 (e.g., through the low pass filter 118 and the summing junction 124) to the pneumatic actuators, the control system 100 can reduce steady state force in the electric actuators 34, 35, thereby reducing associated heat generation.

The vibration reduction system 10 and/or the control system 100 can also be adapted for end effectors oriented primarily in a particular direction or range of directions relative to gravity, which can reduce the complexity of the vibration reduction system 10 and its control. For example, in configurations in which an end effector coupled to the carrier element 14 is configured to operate primarily in an upward orientation relative to a horizontal reference (e.g., a factory floor), any or all of the pneumatic actuators 32 can be configured to provide an extension force. In these configurations, the actuator systems 16 can generally produce extension forces (e.g., forces that act to push the carrier element 14 away from base 12). In embodiments in which the pneumatic actuator is a pneumatic cylinder, the gas pressure can be applied such that the piston pushes upwardly against the weight/force of the end effector. Conversely, in configurations in which an end effector is configured to operate primarily in a downward orientation relative to the horizontal reference (e.g., the end effector is suspended from a robotic system above a workpiece by the hexapod system 10), any or all of the pneumatic actuators 32 can be configured to provide a retraction force. In these configurations, the actuator systems 16 can generally produce retracting forces (e.g., forces that act to pull the carrier element 14 closer to base 12). In embodiments where the pneumatic actuator is a pneumatic cylinder, the gas pressure can be applied such that the piston pulls upwardly/contracts/shortens the actuator system 16 against the weight/force of the end effector.

In other embodiments, the vibration reduction system 10 can include more than six actuator systems 16 or fewer than six actuator systems 16. For example, in certain embodiments the system 10 can include one actuator system 16 oriented along one axis, two actuator systems 16 oriented along two axes (or parallel or substantially parallel), three actuator systems 16 oriented along three axes (or parallel or substantially parallel), etc. In certain embodiments, certain of the actuator systems 16 can comprise a pneumatic actuator while others of the actuator systems 16 can comprise one or more electric actuators. In certain embodiments, one or more of the actuator systems 16 can comprise multiple pneumatic actuators.

Figure 4A:
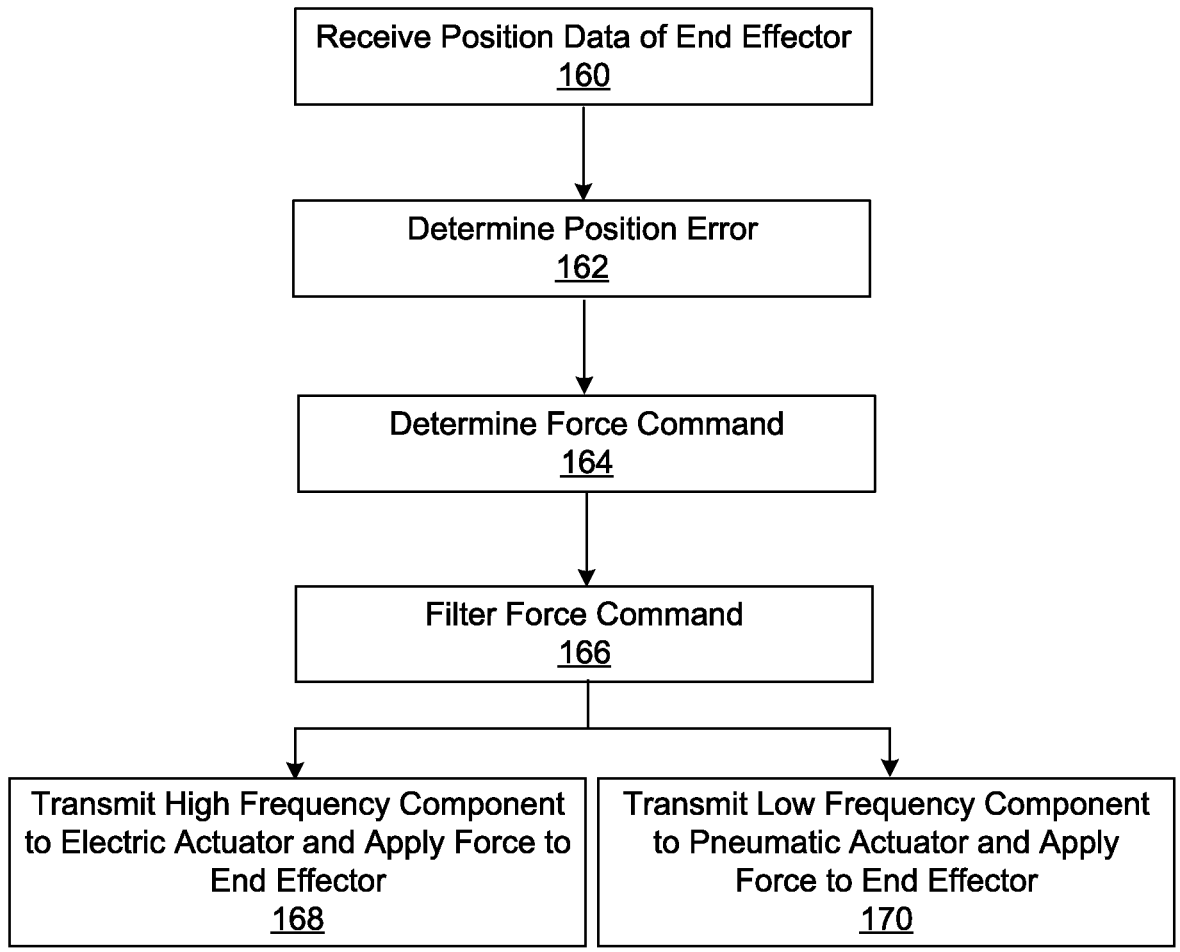
FIGS. 4A and 4B are process flow diagrams of representative methods of damping vibration.

FIG. 4A illustrates a representative method of precise motion control, position control, and/or trajectory control to keep a carrier element and/or end effector free or substantially free of vibration using a vibration reduction system as described herein (e.g., for active and/or passive vibration damping/reduction/control). At process block 160, data of the position of an end effector of a robotic system (or of the carrier element 14) can be received. At process block 162, the position error can be determined relative to a specified position or trajectory, such as by subtracting the measured position from the specified position/trajectory. At process block 164, a force command can be determined based at least in part on the position error. At process block 166, the force command can be filtered to determine a high frequency component and a low frequency component of the force command. At process block 168, the high frequency component of the force command can be transmitted to at least one electric actuator of the system 10 and applied by the electric actuator(s) to the end effector to control/reduce/isolate the end effector from vibration (e.g., high frequency vibration). At process block 170, the low frequency component of the force command can be transmitted to the pneumatic actuator and applied by the pneumatic actuator to the end effector to control/reduce/isolate the end effector from vibration (e.g., low frequency vibration). In certain embodiments, the low frequency and high frequency force commands can be transmitted to the appropriate actuators and applied simultaneously.

Figure 4B:
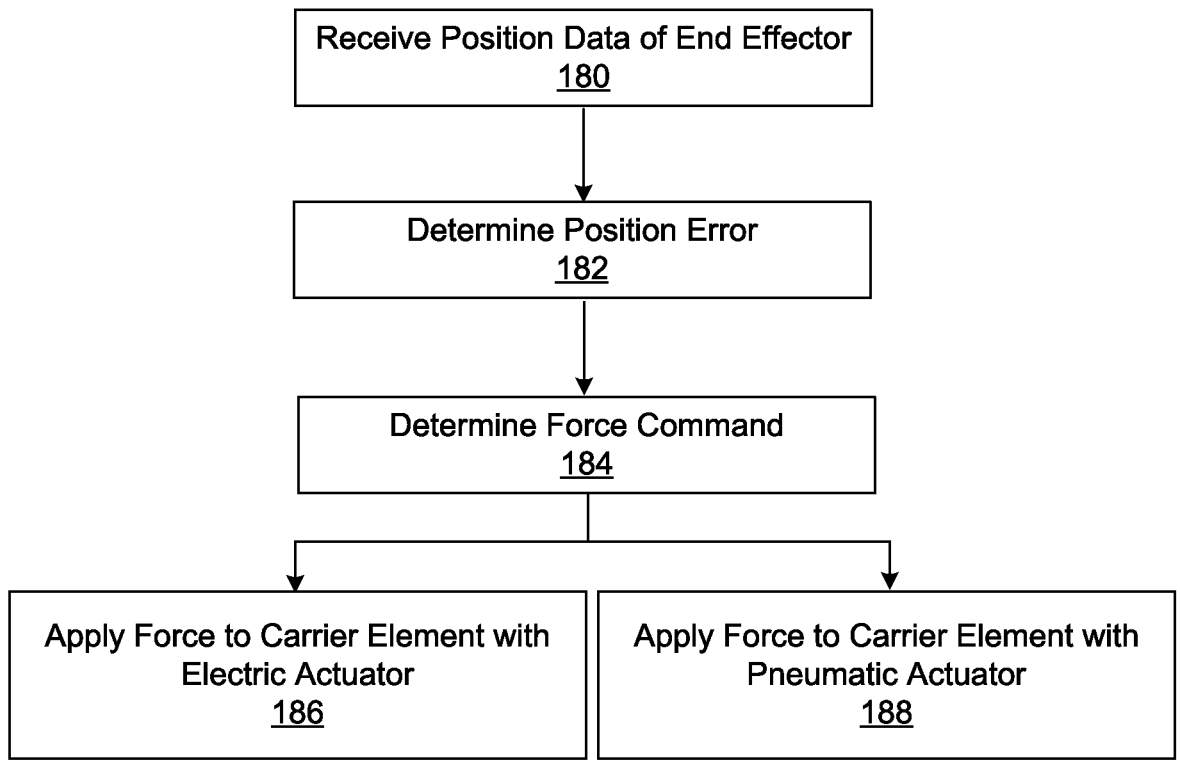

FIG. 4B illustrates another representative control method to keep a carrier element and/or end effector free or substantially free of vibration. At process block 180, data of the position of an end effector of a robotic system (or of the carrier element 14) can be received. At process block 182, the position error can be determined relative to a specified position or trajectory, such as by subtracting the measured position from the specified position/trajectory. At process block 184, a force command can be determined based at least in part on the position error. At process block 186, at least one electric actuator of the system 10 can apply force to the carrier element and/or the end effector based at least in part on the force command to control/reduce/isolate the end effector from vibration (e.g., high frequency vibration). At process block 188, at least one pneumatic actuator of the system 10 can apply force to the carrier element and/or to the end effector based at least in part on the force command to control/reduce/isolate the end effector from vibration (e.g., low frequency vibration). In certain embodiments, the electric and pneumatic actuators can apply force to the carrier element simultaneously, or at different times.

Example 3: Robotic System with Vibration Reduction System

The vibration reduction system 10 and the related control systems can be adapted for use in combination with any of a variety of robotic systems. For example, the system 10 can be coupled to any of a variety of single or multi-axis robots, and can be configured for attachment to any of a variety of end effectors to reduce vibration of the end effectors and/or isolate the end effectors from vibration transmitted to the end effector from the robotic system. Exemplary robotic systems can include, without limitation, anthropomorphic robotic systems, selective compliance assembly robotic systems and/or robotic arms, serial link robotic systems, rectangular robotic systems, cylindrical robotic systems, polar robotic systems, parallel link robotic systems, or any other type/configuration of robotic system.

Figure 5:
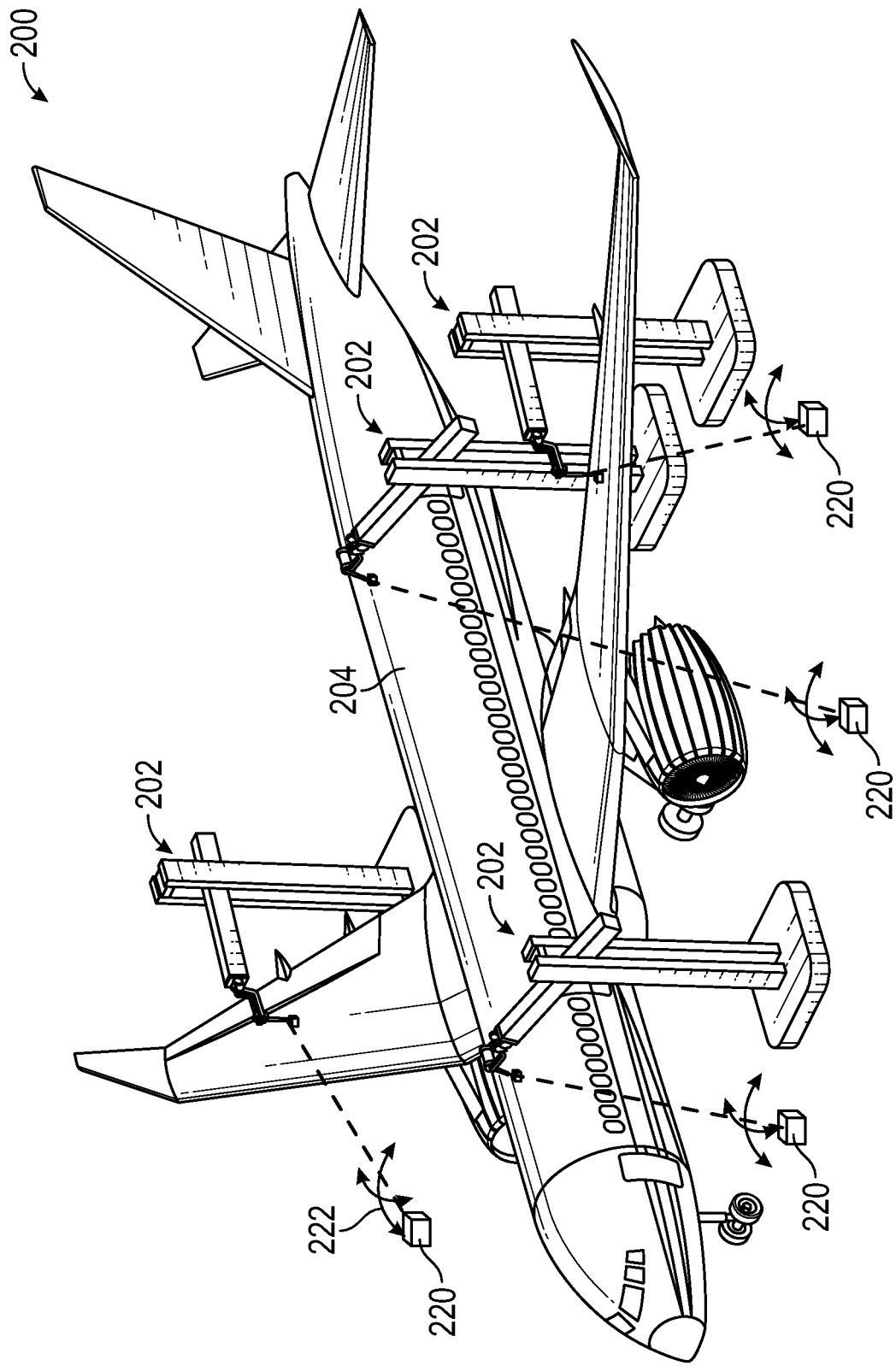
FIG. 5 illustrates a system including a plurality of robotic systems with vibration reduction systems, according to one embodiment.

FIG. 5 illustrates a representative example of a system 200 including a plurality of robotic systems 202 (also referred to as robotic positioning systems) configured to perform one or more processes on a workpiece, according to one embodiment. In the illustrated embodiment the workpiece is an aircraft 204, and the robotic systems 202 are configured to form a textured surface or riblets on the surfaces of the aircraft for drag reduction, as described in International Patent Application Publication No. WO 2020208808A1, which is incorporated herein by reference. In other embodiments, the workpiece can be an airfoil such as a wing, a turbine blade (e.g., for a gas turbine, a steam turbine, a wind turbine, etc.), or an impeller, a vehicle such as a car or truck, a railway carriage or locomotive, or any other object.

Figure 6:
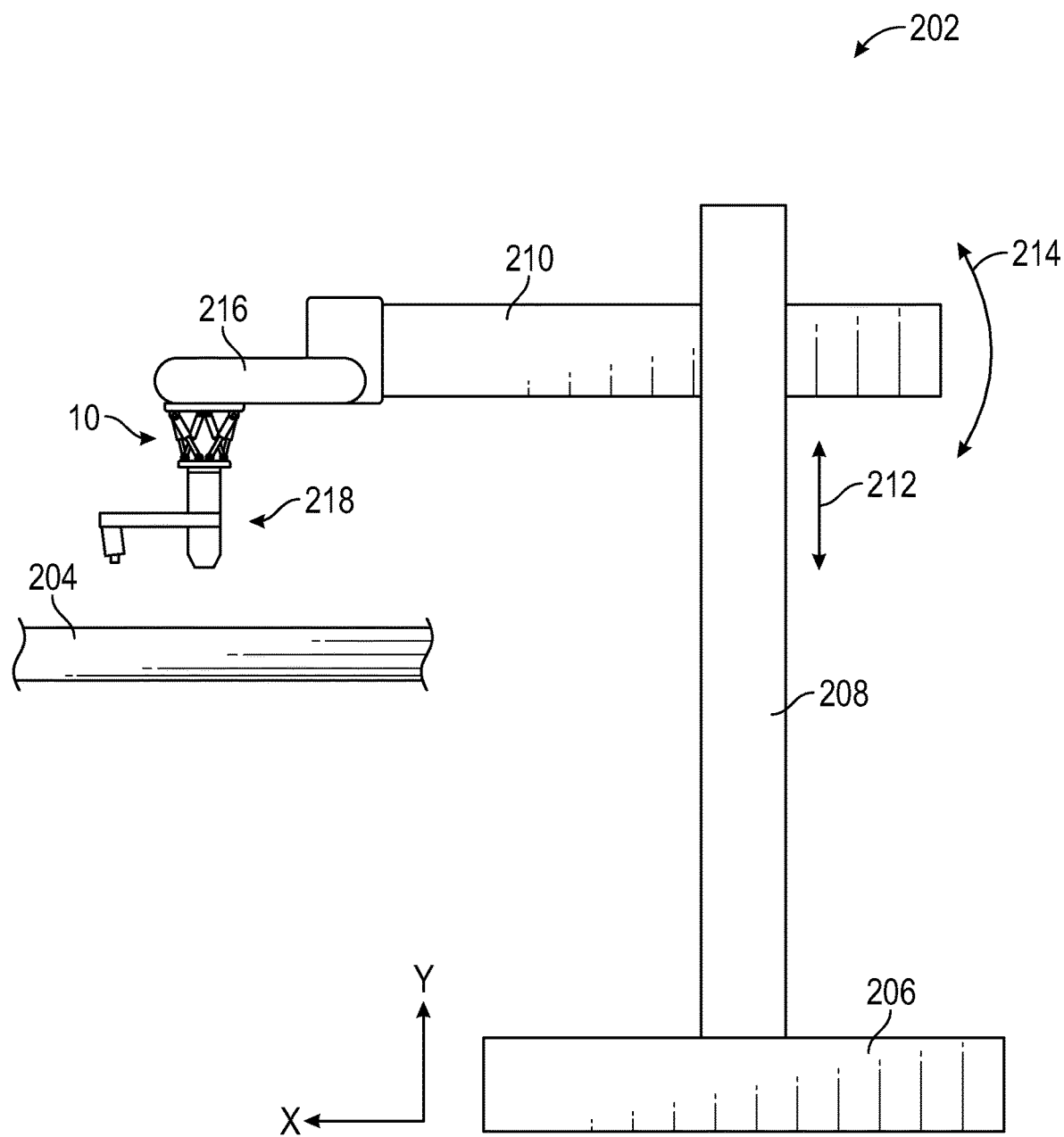
FIG. 6 is a side elevation view of a representative embodiment of a robotic system including the vibration reduction system of FIG. 1 oriented downwardly toward a workpiece.

Referring to FIG. 6, in the illustrated embodiment each robotic system 202 can comprise a base 206, a first member 208 coupled to the base and extending along a first axis (e.g., the y-axis in FIG. 6), and a second member 210 coupled to the first member 208. In certain embodiments, the second member 210 can be movable up and down along the first member 208 as indicated by double-headed arrow 212, and/or can also be pivotable relative to the first member as indicated by double-headed arrow 214. In certain embodiments, the robotic system 202 can comprise one or more manipulator members or links 216 coupled to the end portion of the second member 210. In certain embodiments, the manipulator links 216 can provide for motion in one or more degrees of freedom.

A vibration reduction system 10 configured according to any of the embodiments described herein can be coupled to the manipulator link 216, with the base 12 coupled to the manipulator link 216 and the carrier element 14 coupled to an end effector 218. In the illustrated embodiment, the end effector 218 can be configured as a laser beam machining optical system, or a portion/part thereof. For example, the end effector 218 can include at least a part of an optical system or an optical element (e.g., a light source), for example, for outputting a laser beam. In certain embodiments, the laser light source can be located around the base 206 or at other locations, and can be linked to the end effector by an optical fiber or other light guide/wave guide. The robotic system 202 can be configured to position the optical system 218 relative to the workpiece 204, and the vibration reduction system 10 can be configured to reduce vibration of the optical system 218 and/or position errors of the robotic system, and/or disturbances imparted by cables, hoses, etc., coupled to the robotic system and/or to the end effector. Thus, the robotic system 202 can move/position the optical system 218 relative to the surface of the workpiece to form riblets in the workpiece, and the vibration reduction system 10 can isolate the optical system 218 from vibrations from the links/members of the robotic system 202. Further details regarding the optical system 218 can be found in International Patent Application Publication No. WO 2020208808A1 incorporated by reference above.

Figure 7:
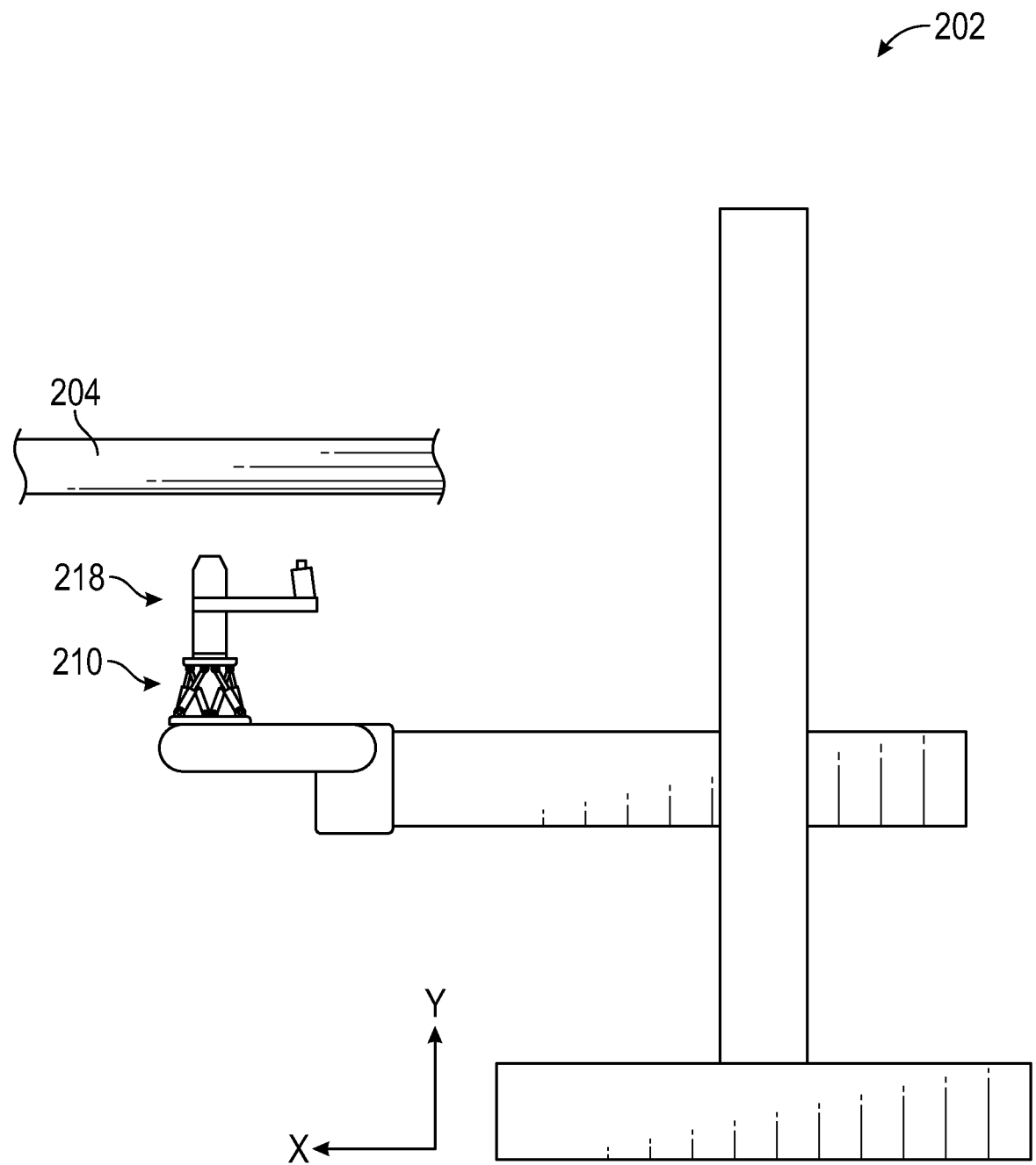
FIG. 7 is a side elevation view of a representative embodiment of a robotic system including the vibration reduction system of FIG. 1 oriented upwardly toward a workpiece.

In certain embodiments, the robotic systems 202 can be configured with the optical system 218 oriented primarily downward along the y-axis as in FIG. 6, or with the optical system oriented primarily upward as in FIG. 7. For downwardly oriented optical systems (or other end effectors), the control system 100 and the vibration reduction system 10 can be configured to provide tensile force control to compensate for the gravitational force on the optical system. In configurations such as FIG. 7 in which the optical system 218 is oriented upwardly, the control system 100 and the vibration reduction system 10 can be configured to provide compressive force control to compensate for the gravitational force/weight of the optical system. The robotic systems 202 can be configured to orient and/or position the end effectors 218 primarily upwardly, primarily downwardly, or to move the end effectors between the upward and downward orientations.

Referring again to FIG. 6, the system 200 can include a plurality of position determination systems 220 (also referred to as localizers). In certain embodiments, the position determination systems 220 can be configured to determine the position, orientation, posture, etc., of one or more of the robotic systems 202, the end effectors 218, etc. In certain embodiments, the position determination systems 220 can be pivotable and/or movable in a variety of directions as indicated by double-headed arrows 222.

Figure 8:
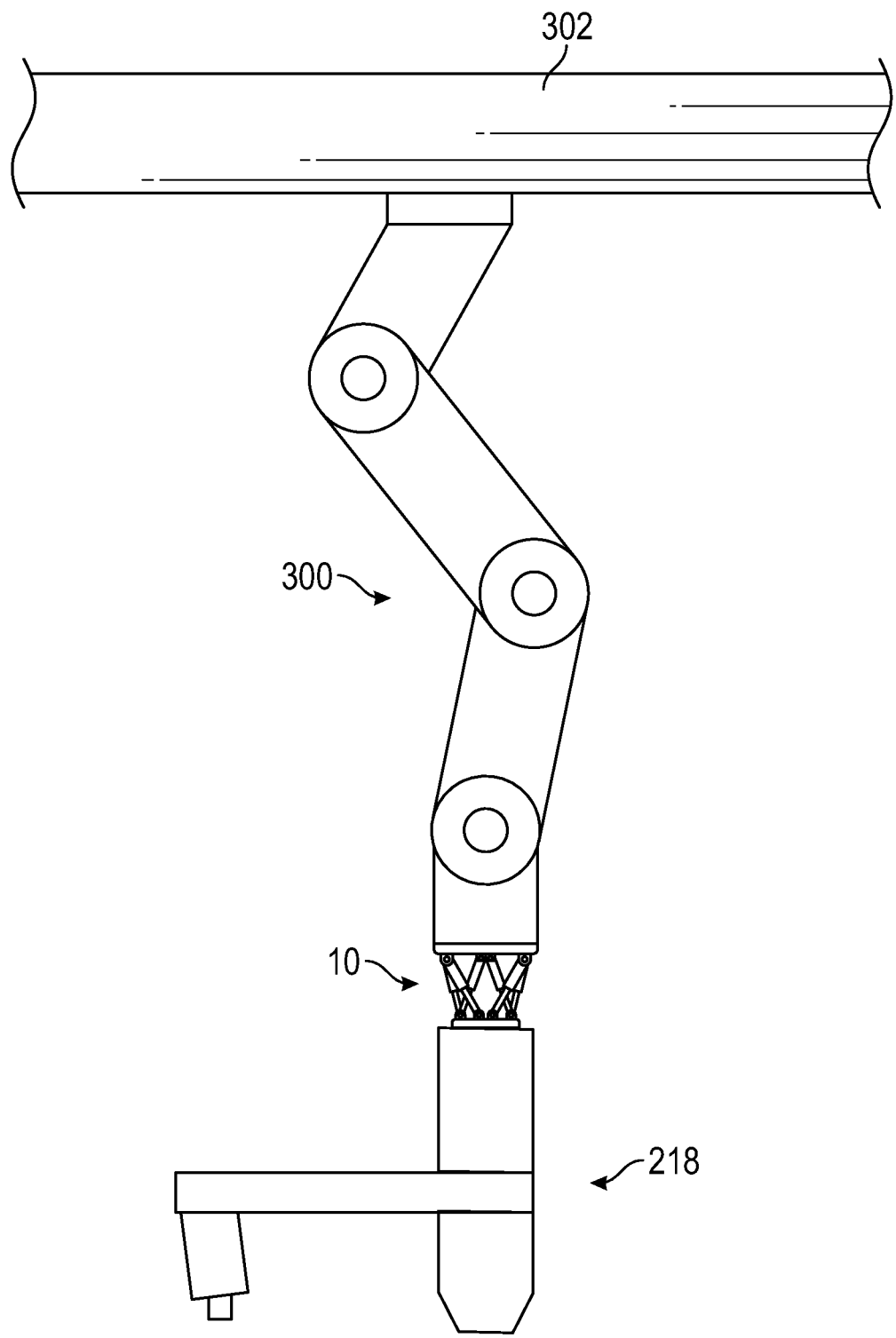
FIG. 8 illustrates the vibration reduction system of FIG. 1 coupled to a representative embodiment of a multi-axis robotic manipulator arm system.

FIG. 8 illustrates the vibration reduction system 10 coupled to a multi-axis robotic manipulator arm system 300. The robotic manipulator arm 300 can be coupled to a gantry or other support frame 302. An end effector configured as an optical system 218 is shown coupled to the carrier element of the vibration reduction system 10, although the robotic system 300 and the vibration reduction system 10 can be used in combination with any of a variety of end effectors. Further details of the robotic system 300 are described in International Patent Application Publication No. WO 2020208808A1 incorporated by reference above.

Figure 9:
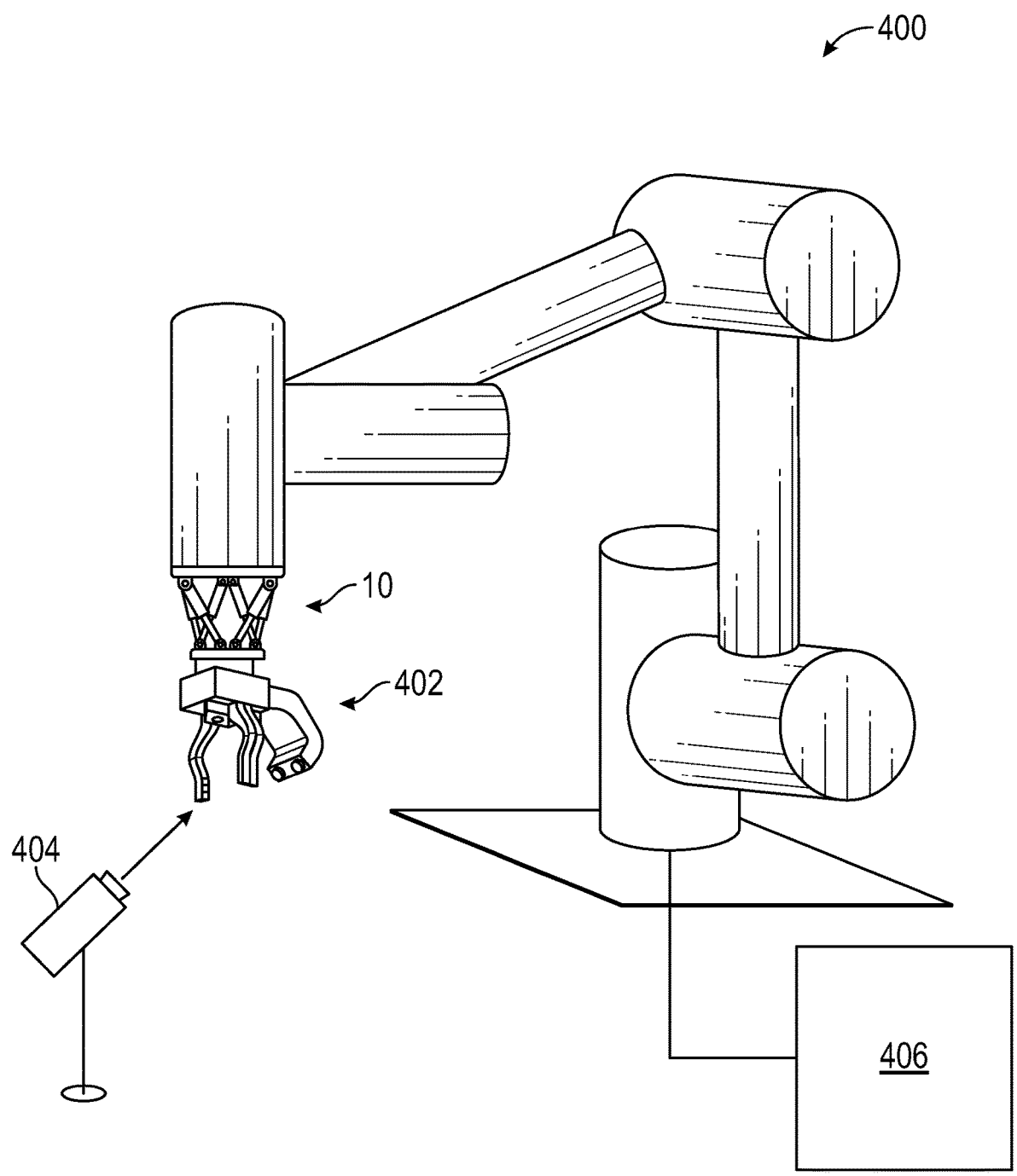
FIG. 9 illustrates the vibration reduction system of FIG. 1 coupled to another embodiment of a multi-axis robotic manipulator arm system.

FIG. 9 illustrates the vibration reduction system 10 coupled to another embodiment of a multi-axis robotic manipulator arm system 400 including a gripper 402, a detection system 404, and a control device schematically shown at 406. In the illustrated embodiment, the vibration reduction system 10 is coupled between the final serial link/member of the robotic manipulator 400 and the gripper 402, and can be configured to isolate the gripper 402 from vibration of the various links of the robotic manipulator 400. Further details of the robotic system 400 can be found in International Patent Application Publication No. WO2020208826A1, which is incorporated herein by reference.

Figure 10:
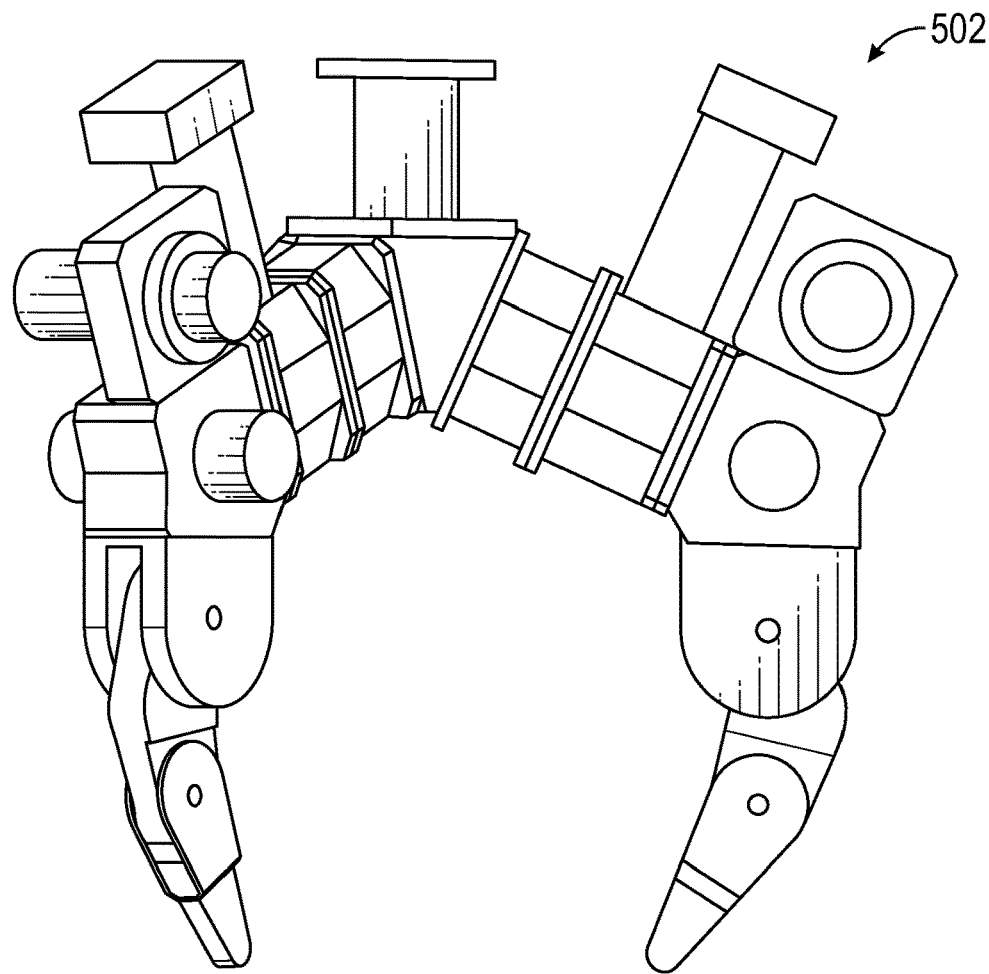
FIGS. 10-15 illustrate various end effectors that can be used in combination with the disclosed vibration reduction systems and robotic systems.
Figure 11:
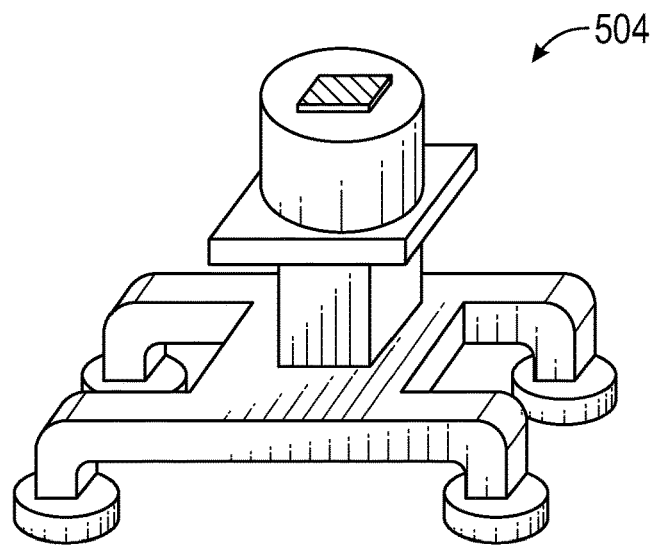
Figure 12:
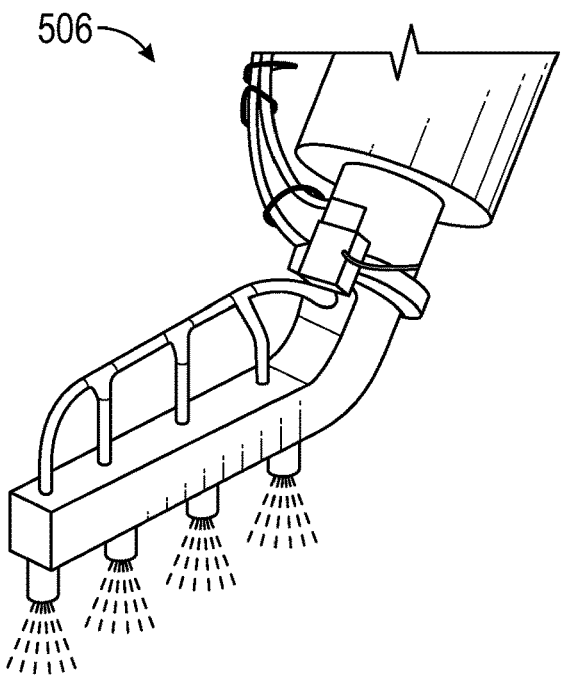
Figure 13:
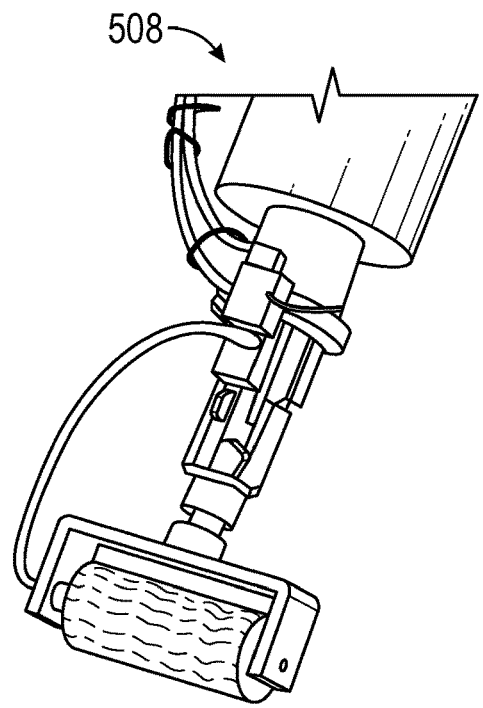
Figure 14:
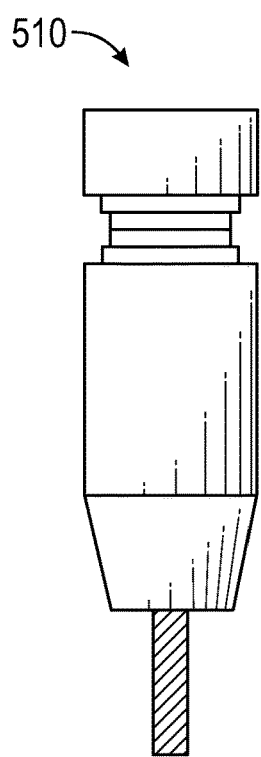
Figure 15:
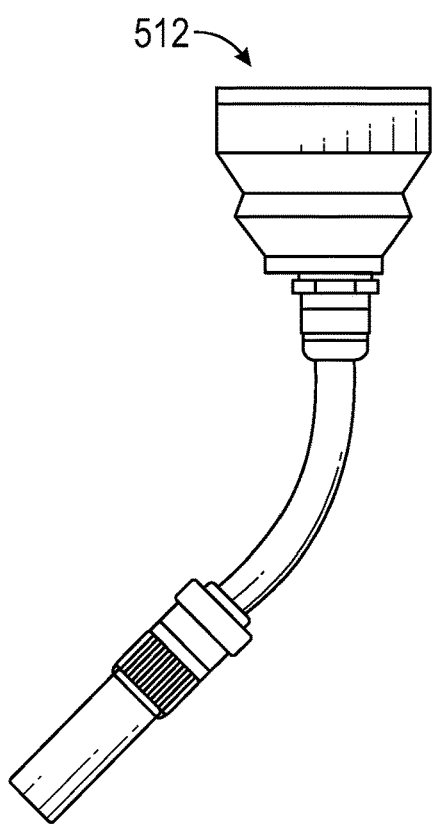

FIGS. 10-15 illustrate representative examples of additional end effectors that can be used in combination with the vibration reduction systems and/or robotic systems described herein. FIG. 10 illustrates a manipulator and/or gripper 502, according to one embodiment. FIG. 11 illustrates a vacuum manipulator 504, according to one embodiment. FIG. 12 illustrates an end effector configured as a liquid coating/applicator device 506 including a plurality of liquid injectors or spray heads. FIG. 13 illustrates an end effector configured as a roller-type liquid coating/applicator device 508, according to one embodiment. FIG. 14 illustrates an end effector configured as a cutter/cutting tool 510, such as a mill or drill, according to one embodiment. FIG. 15 illustrates an end effector configured as a welding tool 512 (e.g., an arc welding head, a torch, etc.).

Example 4: Representative Computing Environment

Figure 17:
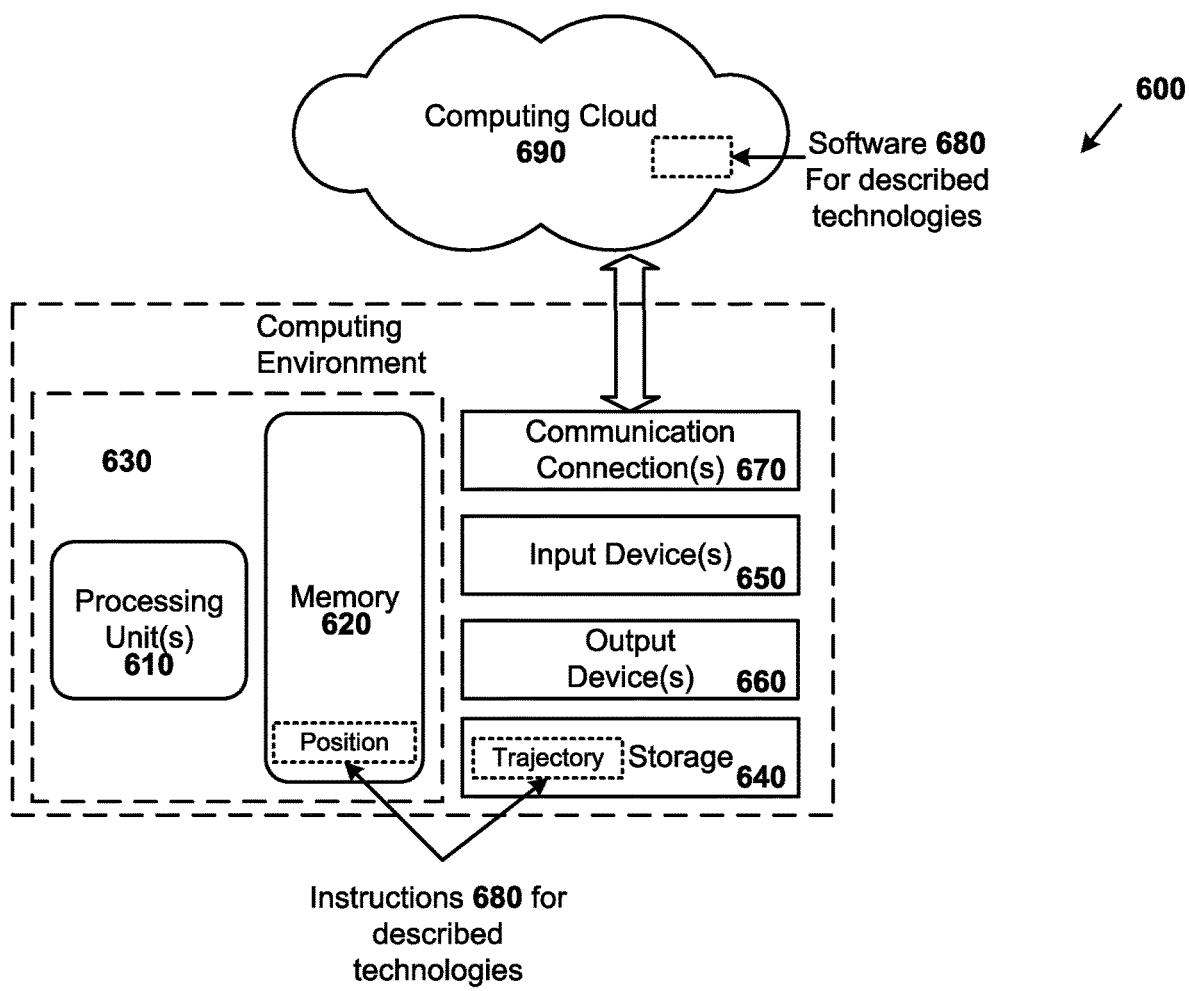
FIG. 17 illustrates a representative computer control system for use in implementing the disclosed systems and methods.

FIG. 17 illustrates a generalized example of a computing environment 600 in which software and control algorithms for the described embodiments can be implemented. For example, software for analyzing the data provided by the optical systems described herein can be configured similarly to the computing environment 600, and can be a local computing system integrated as part of the optical system assembly or can be a remote computing system as described herein.

The computing environment 600 is not intended to suggest any limitation as to scope of use or functionality of the technology, as the technology may be implemented in diverse general-purpose or special-purpose computing environments. For example, the disclosed technology may be implemented with other computer system configurations, including programmable automation controllers, programmable logic controllers, application-specific integrated circuits (ASICs), field-programmable gate arrays (FPGAs), hand held devices, multi-processor systems, programmable consumer electronics, network PCs, minicomputers, and the like. The disclosed control methodology may also be practiced in distributed computing environments where tasks are performed by remote processing devices that are linked through a communications network. In a distributed computing environment, program modules may be located in both local and remote memory storage devices.

With reference to FIG. 17, the computing environment 600 includes at least one processing unit 610 and memory 620. In FIG. 17, this most basic configuration 630 is included within a dashed line. The processing unit 610 executes computer-executable instructions and may be a real or a virtual processor. In a multi-processing system, multiple processing units execute computer-executable instructions to increase processing power and as such, multiple processors can be running simultaneously. The memory 620 may be volatile memory (e.g., registers, cache, RAM), non-volatile memory (e.g., ROM, EEPROM, flash memory, etc.), or some combination of the two. The memory 620 stores software 680 that can, for example, implement the technologies described herein. A computing environment may have additional features. For example, the computing environment 600 includes storage 640, one or more input devices 650, one or more output devices 660, and one or more communication connections 670. An interconnection mechanism (not shown) such as a bus, a controller, or a network, interconnects the components of the computing environment 600. Typically, operating system software (not shown) provides an operating environment for other software executing in the computing environment 600, and coordinates activities of the components of the computing environment 600.

The storage 640 may be removable or non-removable, and includes non-volatile solid state memory, magnetic disks, or any other medium which can be used to store information and that can be accessed within the computing environment 600. The storage 640 stores instructions for the software 680, plugin data, and messages, which can be used to implement technologies described herein.

The input device(s) 650 may be, for example, an accelerometer, a position sensor such as an optical time-of-flight sensor, a temperature sensor, a position encoder, or a touch input device such as a keyboard, keypad, mouse, touch screen display, pen, or trackball, a voice input device, a scanning device, or another device, that provides input to the computing environment 600. The output device(s) 660 may be a wired or wireless signal transmitter, a display, or another device that provides output from the computing environment 600.

The communication connection(s) 670 enable communication over a communication medium (e.g., a connecting network) to devices or computing entities. The communication medium conveys information such as control signals, computer-executable instructions, sensor inputs or outputs, or other data in a modulated data signal. The communication connection(s) 670 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed controlled devices.

Some embodiments of the disclosed methods can be performed using computer-executable instructions implementing all or a portion of the disclosed technology in a computing cloud 690 or other remote computing system. For example, the disclosed methods can be executed on processing units 610 located in the computing environment 630, or the disclosed methods can be executed on servers located in the computing cloud 690.

Computer-readable media are any available media that can be accessed within a computing environment 600. By way of example, and not limitation, with the computing environment 600, computer-readable media include memory 620 and/or storage 640. As should be readily understood, the term computer-readable storage media includes the media for data storage such as memory 620 and storage 640, and not transmission media such as modulated data signals.

Explanation of Terms

For purposes of this description, certain aspects, advantages, and novel features of the embodiments of this disclosure are described herein. The disclosed methods, apparatus, and systems are not limiting in any way. Instead, the present disclosure is directed toward all novel features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved. The scope of this disclosure includes any features disclosed herein combined with any other features disclosed herein, unless physically impossible.

Although the operations of some of the disclosed embodiments are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed components can be used in conjunction with other components.

As used in this disclosure and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. Such descriptions are intended to indicate that a selection among many alternatives can be made, and such selections need not be better, smaller, or otherwise preferable to other selections.

In the description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Unless otherwise indicated, all numbers expressing frequencies, forces, material quantities, angles, pressures, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art. When directly and explicitly distinguishing embodiments from discussed prior art, the embodiment numbers are not approximates unless the word "about" is recited. Furthermore, not all alternatives recited herein are equivalents.

Although there are alternatives for various components, parameters, operating conditions, etc., set forth herein, that does not mean that those alternatives are necessarily equivalent and/or perform equally well. Nor does it mean that the alternatives are listed in a preferred order unless stated otherwise.

In view of the many possible embodiments to which the principles of the disclosed technology may be applied, it should be recognized that the illustrated embodiments are only examples and should not be taken as limiting the scope of the disclosure. Rather, the scope of the disclosure is at least as broad as the following claims and their equivalents. We therefore claim all that comes within the scope and spirit of these claims.

The invention claimed is:

1. A robotic vibration reduction system, comprising:
a robot arm system;
a vibration reduction system that is coupled to the robot arm system;
an end effector that is coupled to the vibration reduction system; and
a controller;
wherein the vibration reduction system comprises:
a base;
a carrier element;
a plurality of actuator systems extending between the base and the carrier element, the plurality of actuator systems arranged to apply forces to the carrier element in multiple axes to reduce vibration and/or a position error of the carrier element, each actuator system of the plurality of actuator systems comprising a pneumatic actuator and an electric actuator; and
wherein the controller is configured to control at least one of the pneumatic actuator and the electric actuator to apply force to the carrier element to reduce vibration and/or the position error of the carrier element; and
wherein the vibration reduction system is located between the robot arm system and the end effector.

2. The robotic system of claim 1, wherein the pneumatic actuator comprises a pneumatic cylinder, and the electric actuator comprises a voice coil motor.

3. The robotic system of claim 1, wherein actuator systems of the plurality of actuator systems are angled relative to a longitudinal axis of the vibration reduction system, and the pneumatic actuator and the electric actuator of each actuator system are arranged in parallel.

4. The robotic system of claim 1, wherein the electric actuator of each actuator system is one of a plurality of electric actuators.

5. The robotic system of claim 1, wherein the vibration reduction system is configured as a Stewart platform.

6. The robotic system of claim 1, wherein the actuator systems are low stiffness actuator systems.

7. The robotic system of claim 1, wherein the plurality of actuator systems are oriented in different directions.

8. The robotic system of claim 1, wherein the actuator systems are coupled to the base in first pairs, and coupled to the carrier element in second pairs comprising different actuator systems than the first pairs.

9. The robotic system of claim 1, wherein:
pairs of actuator systems and the carrier element form triangular arrangements with vertices on the base; and
pairs of actuator systems and the base form triangular arrangements with vertices on the carrier element.

10. The robotic system of claim 1, wherein the carrier element is located between the base and an object coupled to the carrier element.

11. The robotic system of claim 1, wherein the end effector is coupled to the carrier element of the vibration reduction system.

12. The robotic system of claim 11, wherein the end effector is at least a part of a laser beam machining optical system, a gripper, or a liquid applicator.

13. The robotic system of claim 1, wherein the electric actuator and the pneumatic actuator of each actuator system are coaxially aligned and act on the carrier element along a common axis.

14. The robotic system of claim 13, wherein the pneumatic actuator of each actuator system comprises a pneumatic cylinder and a piston that seals against walls of the pneumatic cylinder, and the electric actuator is positioned inside the pneumatic cylinder.

15. A method, comprising controlling forces applied to the end effector of the robotic system of claim 1 using the vibration reduction system.

16. A method, comprising:
receiving at least position data of a carrier element, the carrier element being coupled to a vibration reduction system, the vibration reduction system being located between an end effector and a robot arm system of a robotic system, the vibration reduction system comprising a plurality of actuator systems extending between a base and the carrier element, the plurality of actuator systems being arranged to apply force to the carrier element in multiple axes, each of the actuator systems comprising a pneumatic actuator and an electric actuator;
determining a position error based at least in part on the position data of the carrier element; and
controlling at least one pneumatic actuator and at least one electric actuator based on the position error to apply force to the end effector.

17. The method of claim 16, wherein the controlling further comprises:
determining a force command based at least in part on the position error;
filtering the force command to determine a high frequency component of the force command and a low frequency component of the force command;
transmitting the high frequency component of the force command to the electric actuator of at least one of the actuator systems of the vibration reduction system; and
transmitting the low frequency component of the force command to the pneumatic actuator of at least one of the actuator systems of the vibration reduction system.

18. The method of claim 17, further comprising combining the low frequency component of the force command with a feedforward force command based at least in part on a direction of a gravitational force on an end effector coupled to the carrier element.

19. The method of claim 17, wherein determining the force command further comprises combining the position error with a feedforward force command based at least in part on an acceleration associated with a specified position.

20. The method of claim 16, further comprising:
determining a force command based at least in part on the position error; and
wherein controlling at least one of the pneumatic actuator and at least one electric actuator further comprises:
applying force to the carrier element with the electric actuator of at least one of the actuator systems based at least in part on the force command; and
applying force to the carrier element with the pneumatic actuator of at least one of the actuator systems based at least in part on the force command.

21. The method of claim 20, wherein receiving position data of the carrier element further comprises receiving position data of the end effector of the robotic system relative to a workpiece, the end effector being coupled to the carrier element.

22. The method of claim 16, wherein the carrier element is an end effector of a robotic system.

23. A method, comprising:
receiving at least position data of a carrier element, the carrier element being coupled to a vibration reduction system comprising a plurality of actuator systems extending between a base and the carrier element, the plurality of actuator systems being arranged to apply force to the carrier element in multiple axes, each of the actuator systems comprising a pneumatic actuator and an electric actuator;
determining a position error based at least in part on the position data of the carrier element;
controlling at least one pneumatic actuator and at least one electric actuator based on the position error, wherein the controlling comprises:
determining a force command based at least in part on the position error;
filtering the force command to determine a high frequency component of the force command and a low frequency component of the force command;
transmitting the high frequency component of the force command to the electric actuator of at least one of the actuator systems of the vibration reduction system;
transmitting the low frequency component of the force command to the pneumatic actuator of at least one of the actuator systems of the vibration reduction system; and
combining the low frequency component of the force command with a feedforward force command based at least in part on a direction of a gravitational force on an end effector coupled to the carrier element.

24. A method, comprising:
receiving at least position data of a carrier element, the carrier element being coupled to a vibration reduction system comprising a plurality of actuator systems extending between a base and the carrier element, the plurality of actuator systems being arranged to apply force to the carrier element in multiple axes, each of the actuator systems comprising a pneumatic actuator and an electric actuator;
determining a position error based at least in part on the position data of the carrier element;
controlling at least one pneumatic actuator and at least one electric actuator based on the position error, wherein the controlling comprises:
determining a force command based at least in part on the position error;
filtering the force command to determine a high frequency component of the force command and a low frequency component of the force command;
transmitting the high frequency component of the force command to the electric actuator of at least one of the actuator systems of the vibration reduction system;
transmitting the low frequency component of the force command to the pneumatic actuator of at least one of the actuator systems of the vibration reduction system; and
wherein determining the force command further comprises combining the position error with a feedforward force command based at least in part on an acceleration associated with a specified position.

* * * * *